US011265431B2

(12) United States Patent
Inoue

(10) Patent No.: US 11,265,431 B2
(45) Date of Patent: Mar. 1, 2022

(54) IMAGE PROCESSING APPARATUS FOR INPUTTING CHARACTERS USING TOUCH PANEL, CONTROL METHOD THEREOF AND STORAGE MEDIUM

(71) Applicant: CANON KABUSHIKI KAISHA, Tokyo (JP)

(72) Inventor: Kenta Inoue, Shimotsuke (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/851,222

(22) Filed: Apr. 17, 2020

(65) Prior Publication Data
US 2020/0336612 A1 Oct. 22, 2020

(30) Foreign Application Priority Data

Apr. 19, 2019 (JP) .............................. JP2019-080362

(51) Int. Cl.
H04N 1/00 (2006.01)
G06F 40/166 (2020.01)

(52) U.S. Cl.
CPC ....... H04N 1/00411 (2013.01); G06F 40/166 (2020.01)

(58) Field of Classification Search
None
See application file for complete search history.

(56) References Cited

U.S. PATENT DOCUMENTS

| 5,228,100 | A * | 7/1993 | Takeda ................... G06F 40/174 382/175 |
| 5,638,495 | A * | 6/1997 | Arai ......................... G06F 40/53 358/1.2 |
| 5,867,700 | A * | 2/1999 | Ohkura .................. G06F 40/166 |
| 5,917,475 | A * | 6/1999 | Kuzunuki ............. G06F 3/0481 345/173 |
| 7,046,848 | B1 * | 5/2006 | Olcott ................ G06K 9/00442 382/176 |
| 10,521,909 | B2 * | 12/2019 | Kikuchi ................ G06T 7/0016 |
| 10,970,580 | B2 * | 4/2021 | Nakatsuka .......... H04N 1/00331 |
| 2004/0021700 | A1 * | 2/2004 | Iwema ................... G06K 9/033 715/863 |
| 2006/0072782 | A1 * | 4/2006 | Abe .................... H04N 1/32144 382/100 |
| 2006/0221358 | A1 * | 10/2006 | Takahashi .......... H04N 1/00472 358/1.1 |
| 2007/0061723 | A1 | 3/2007 | Ohga et al. .................... 715/705 |

(Continued)

FOREIGN PATENT DOCUMENTS

JP 2007-065809 3/2007
JP 2008-071050 3/2008
(Continued)

OTHER PUBLICATIONS

U.S. Appl. No. 16/851,236, filed Apr. 17, 2020.
(Continued)

Primary Examiner — Anh-Vinh Thi Nguyen
(74) Attorney, Agent, or Firm — Venable LLP

(57) ABSTRACT

An object is to implement deletion of an already-input character string in a UI screen by a simpler operation without using a dedicated deletion button. An input character string is deleted in a case where a user selects the same character string as the character string used for a touch input.

16 Claims, 27 Drawing Sheets

(56) References Cited

U.S. PATENT DOCUMENTS

| | | | |
|---|---|---|---|
| 2008/0115080 A1* | 5/2008 | Matulic | H04N 1/00464 715/778 |
| 2008/0170786 A1* | 7/2008 | Tomizawa | G06K 9/033 382/176 |
| 2010/0128298 A1* | 5/2010 | Matsugashita | G06F 3/1288 358/1.13 |
| 2010/0220929 A1* | 9/2010 | Misawa | G06F 16/54 382/190 |
| 2010/0283736 A1* | 11/2010 | Akabane | G06F 3/0237 345/168 |
| 2011/0097002 A1* | 4/2011 | Ishiguro | G06K 9/348 382/229 |
| 2011/0242568 A1 | 10/2011 | Soga | 358/1.13 |
| 2011/0302520 A1* | 12/2011 | Yuasa | H04N 1/00413 715/773 |
| 2013/0297575 A1* | 11/2013 | Fallon | H03M 7/4062 707/693 |
| 2014/0026043 A1* | 1/2014 | Takeuchi | G06F 40/174 715/261 |
| 2014/0153787 A1* | 6/2014 | Schmidtler | H04N 1/40 382/112 |
| 2015/0154269 A1* | 6/2015 | Miller | G06F 16/2477 715/780 |
| 2015/0262034 A1 | 9/2015 | Hayakawa | 382/195 |
| 2016/0072968 A1* | 3/2016 | Nakamura | H04N 1/00241 358/1.15 |
| 2017/0075877 A1* | 3/2017 | Lepeltier | G06F 40/205 |
| 2017/0161826 A1* | 6/2017 | Packer | G06Q 40/025 |
| 2017/0257520 A1* | 9/2017 | Miura | H04N 1/4177 |
| 2017/0357412 A1* | 12/2017 | Shiode | G06F 9/451 |
| 2018/0218206 A1* | 8/2018 | Kamata | G06F 40/10 |
| 2018/0218208 A1 | 8/2018 | Arakawa | G06K 9/72 |
| 2018/0267947 A1* | 9/2018 | Miller | G06F 16/2477 |
| 2018/0285069 A1* | 10/2018 | Matsuo | H04N 1/00493 |
| 2019/0065451 A1* | 2/2019 | Miyamoto | H04N 1/00331 |
| 2019/0065842 A1* | 2/2019 | Soga | G06K 9/2081 |
| 2019/0089849 A1* | 3/2019 | Yamazaki | H04N 1/00331 |
| 2019/0102385 A1* | 4/2019 | Tokita | G06F 16/164 |
| 2019/0228220 A1* | 7/2019 | Matsumoto | G06K 9/00449 |
| 2019/0230232 A1* | 7/2019 | Soga | H04N 1/0044 |
| 2019/0244020 A1* | 8/2019 | Yoshino | H04N 1/00331 |
| 2019/0245989 A1* | 8/2019 | Yoshida | G06F 3/1205 |
| 2019/0303701 A1* | 10/2019 | Kazume | G06F 16/164 |
| 2019/0362143 A1* | 11/2019 | Nakamura | G06K 9/00469 |
| 2020/0042261 A1 | 2/2020 | Mochizuki | H04N 1/4426 |
| 2020/0162624 A1* | 5/2020 | Tsukada | G06K 9/2054 |
| 2020/0167589 A1* | 5/2020 | Kumahashi | G06F 3/041 |
| 2020/0280644 A1* | 9/2020 | Shimakawa | G06K 9/00449 |
| 2020/0314250 A1* | 10/2020 | Kobayashi | H04N 1/0001 |
| 2020/0336611 A1* | 10/2020 | Soga | H04N 1/00411 |
| 2020/0336613 A1* | 10/2020 | Shiraishi | G06F 3/04817 |
| 2020/0382661 A1* | 12/2020 | Ito | H04N 1/00005 |
| 2020/0389567 A1* | 12/2020 | Kumahashi | G06F 16/51 |
| 2021/0105380 A1* | 4/2021 | Nakamura | H04N 1/00384 |

FOREIGN PATENT DOCUMENTS

| | | |
|---|---|---|
| JP | 2012-243229 | 12/2012 |
| JP | 2015-173418 | 10/2015 |
| JP | 2016-186717 | 10/2016 |
| JP | 2018-124656 | 8/2018 |

OTHER PUBLICATIONS

U.S. Appl. No. 16/851,223, filed Apr. 17, 2020.
U.S. Appl. No. 16/851,215, filed Apr. 17, 2020.
U.S. Appl. No. 16/851,230, filed Apr. 17, 2020.

* cited by examiner

FIG.9A

```
{
  "processId": "00039000-5555-3f33-5552-6999c30bcccc"
}
```

FIG.9B

```
{
  "status": "processing"
}
```

FIG.9C

```
{
  "status": "completed",
  "ocrResultUrl": "https://mfpservice/output-images/00039000-5555-3f33-5552-6999c30bcccc/ocrResult.json",
  "matchingResultUrl": "https://mfpservice/output-images/00039000-5555-3f33-5552-6999c30bcccc/matchingResult.json",
  "formKeys": [
    {
      "key": "filename",
      "keyType": "filename",
      "value": "",
      "type": "string",
      "displayName": "file name",
      "required": true,
      "multiSelect": true,
      "separator": "-",
      "autoInput": true
    }
  ]
}
```

File name setting screen 1000

1001
1003
×

1002

Estimation form

〒100-9999
B-B-B, Minato-ku, Tokyo

Estimation No.:R12-3456
Date of issue:2017/09/10

Shinagawa Inc. To

1006 ↩
1004 ⊕
1005 ⊖

| Item | Unit price | Quantity | Amount |

1007
Transmit

FIG.10

```
{
  "formId": "aaaaaaaa-ffff-49ab-acf8-55558888eeee",
  "learningContent": {
  "rectInfoArray": [
    {
      "key": "fileRegion0",
      "region": {
      "rect": {
      "x": 1017,
      "y": 302,
      "width": 489,
      "height": 94
      }
      }
    },
    {
      "key": "fileRegion1",
      "region": {
      "rect": {
      "x": 406,
      "y": 626,
      "width": 594,
      "height": 71
      }
      }
    }
  ],
  "metadataArray": [
    {
      "key": "filename",
      "keyType": "filename",
      "value": [
      "fileRegion00",
      "seperator",
      "fileRegion01"
      ]
    }
  ]
  }
}
```

FIG.11

Estimation form

〒100-9999
B-B-B, Minato-ku, Tokyo
Shinagawa Inc. To

Estimation No.:R12-3456
Date of issue:2017/09/10

| Item | Unit price | Quantity | Amount |
|---|---|---|---|
| GF-1544 | 11,550 | 3 | 34,650 |
| EF24-70 | 134,100 | 1 | 134,100 |
|  |  |  |  |
|  |  |  |  |
|  |  | Total | 168,750 |

Kawasaki Inc.
〒200-1111
2-2-200, Yokohama-shi,
Kanagawa prefecture

FIG.13

```
{
  "imageWidth": 2490,
  "imageHeight": 3515,
  "regions": [
    {
      "rect": {
        "x": 1019,
        "y": 303,
        "width": 489,
        "height": 95
      },
      "text": "Estimation form"
    },
    {
      "rect": {
        "x": 261,
        "y": 446,
        "width": 243,
        "height": 43
      },
      "text": "〒100-9999"
    },
    {
      "rect": {
        "x": 1584,
        "y": 446,
        "width": 262,
        "height": 36
      },
      "text": "Estimation No.:"
    },
    {
      "rect": {
        "x": 1874,
        "y": 443,
        "width": 230,
        "height": 47
      },
      "text": "R12-3456"
    }
        ⋮
※elements corresponding to the number of character areas are added to "regions"
        ⋮
  ]
}
```

FIG.15

```
{
  "matched": true,
  "formId": "aaaaaaaa-ffff-49ab-acf8-55558888eeee",
  "matchingScore": 0.74582005269911589,
  "rectInfoArray": [
    {
      "key": "fileRegion0",
      "region": {
        "rect": {
          "x": 1017,
          "y": 302,
          "width": 489,
          "height": 94
        },
        "text": "Estimation form"
      }
    },
    {
      "key": "fileRegion1",
      "region": {
        "rect": {
          "x": 386,
          "y": 626,
          "width": 624,
          "height": 70
        },
        "text": "Shimomaruko Inc."
      }
    }
  ],
  "metadataArray": [
    {
      "key": "filename",
      "keyType": "filename",
      "value": [
        "fileRegion0",
        "separator",
        "file egion1"
      ]
    }
  ]
}
```

FIG.16

Estimation form

〒100-9999
A-A-A, Ohta-ku, Tokyo
Shimomaruko Inc. To

Estimation No.:R12-3500
Date of issue:2017/09/29

| Item | Unit price | Quantity | Amount |
|---|---|---|---|
| GF-1555 | 10,000 | 2 | 20,000 |
|  |  |  |  |
|  |  |  |  |
|  |  |  |  |
|  |  | Total | 20,000 |

Kawasaki Inc.
〒200-1111
2-2-200, Yokohama-shi,
Kanagawa prefecture

FIG.17

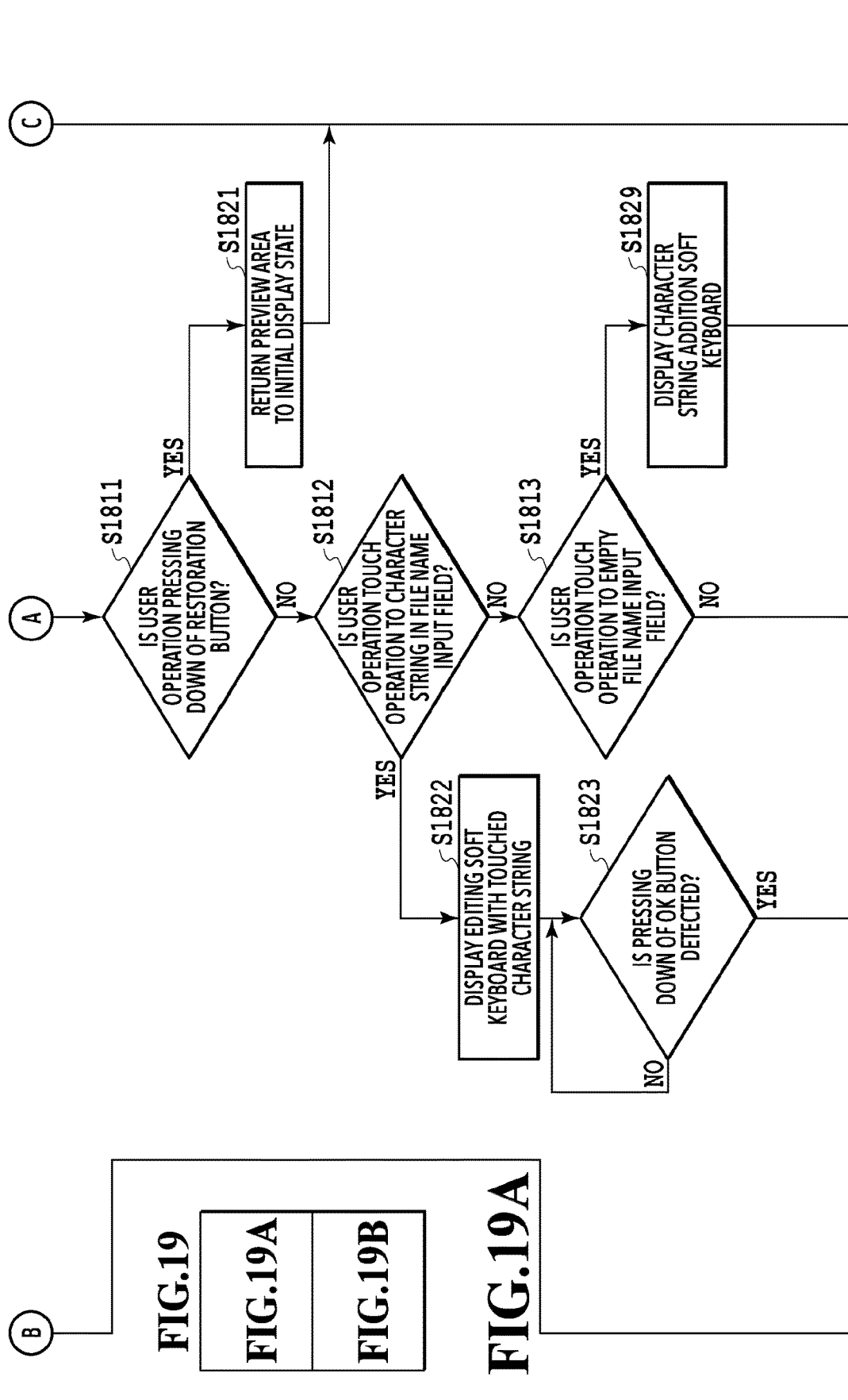

THE PORTION THAT IS
DISPLAYED IN THE PREVIEW
AREA IN THE INITIAL STATE

Estimation form

〒100-9999
B-B-B, Minato-ku, Tokyo
Shinagawa Inc. To

Estimation No.:R12-3456
Date of issue:2017/09/10

| Item | Unit price | Quantity | Amount |
|---|---|---|---|
| GF-1544 | 11,550 | 3 | 34,650 |
| EF24-70 | 134,100 | 1 | 134,100 |
|  |  |  |  |
|  |  |  |  |
|  |  | 合計 | 168,750 |

Kawasaki Inc.
〒200-1111
2-2-200, Yokohama-shi,
Kanagawa prefecture

File name setting screen — 1000

Estimation form_Shimomaruko Inc. — 1001

[×] — 1003

1002

Estimation form

〒100-9999
A-A-A, Ohta-ku, Tokyo

Estimation No.:R12-3500
Date of issue:2017/09/29

Shimomaruko Inc. To

1006 — ⤺
1004 — ⊕
1005 — ⊖

| Item | Unit price | Quantity | Amount |

1007 — Transmit

Estimation form

〒100-9999
B-B-B, Minato-ku, Tokyo
Shinagawa Inc. To

Estimation No.:R12-3456
Date of issue:2017/09/10

| Item | Unit price | Quantity | Amount |
|---|---|---|---|
| GF-1544 | 11,550 | 3 | 34,650 |
| EF24-70 | 134,100 | 1 | 134,100 |
| | | | |
| | | | |
| | | Total | 168,750 |

Kawasaki Inc.
〒200-1111
2-2-200, Yokohama-shi,
Kanagawa prefecture

THE PORTION THAT IS DISPLAYED IN THE PREVIEW AREA IN THE INITIAL STATE

IMAGE PROCESSING APPARATUS FOR INPUTTING CHARACTERS USING TOUCH PANEL, CONTROL METHOD THEREOF AND STORAGE MEDIUM

BACKGROUND OF THE INVENTION

Field of the Invention

The technique of the present invention relates to a character input technique using a touch panel.

Description of the Related Art

Conventionally, in order to delete a character string that is input with a touch panel, a dedicated deletion button is provided in many cases. However, in a case of a general deletion button, it is only possible to delete one character each time, and therefore, for example, it is necessary for a user who desires to shorten an automatically input file name that is too long to operate the deletion button repeatedly in order to obtain a desired file name. Further, also in a case where a character string is input erroneously, it is necessary for a user to move his/her finger up to the deletion button and perform the operation each time. As regards this point, Japanese Patent Laid-Open No. 2016-186717 has disclosed a technique that obviates repetition of the button operation by returning the state to the state before conversion by one-time operation of the deletion button in a case where a character string is input erroneously by predictive conversion. Further, Japanese Patent Laid-Open No. 2012-243229 has disclosed a technique to replace, in a case where a character that is not intended is input by an erroneous touch operation, the erroneously input character with a peripheral character that is originally desired to be input in response to the operation to touch and slide the same character.

According to the technique of Japanese Patent Laid-Open No. 2016-186717 described above, time and effort taken by operating the deletion button many times are eliminated, but it is not possible to eliminate the operation of the deletion button itself. Further, even with the technique of Japanese Patent Laid-Open No. 2012-243229, in a case where a user does not intend to input a character string originally but the user touches the touch panel erroneously, only the way to delete the input character is to operate the deletion button, and therefore, it is necessary for a user to move his/her finger or the like to the deletion button.

The technique of the present invention has been made in order to deal with the above-described problem. That is, an object is to implement deletion of an already-input character string by a simpler operation without using a dedicated deletion button.

SUMMARY OF THE INVENTION

The image processing apparatus according to the present invention is an image processing apparatus for setting a property to a scanned image obtained by scanning a document, and includes: a user interface unit having a touch panel; detecting a character area from the scanned image; and controlling to display a UI screen for setting a property to the scanned image on the touch panel, and on the UI screen, an input field for inputting a character string configuring the property exists and in a case where a user selects a character area by a touch operation from among detected character areas, the controlling further includes: adding, in a case where a character string corresponding to the selected character area is not input in the input field, the character string to the input field; and deleting, in a case where a character string corresponding to the selected character area is input already in the input field, the character string from the input field.

Further features of the present invention will become apparent from the following description of exemplary embodiments with reference to the attached drawings.

BRIEF DESCRIPTION OF THE DRAWINGS

FIG. 9A is a diagram showing an example of a request ID and FIG. 9B and FIG. 9C are each a diagram showing an example of a response to an inquiry about a processing situation;

FIG. 10 is a diagram showing an example of a File name setting screen;

FIG. 11 is a diagram showing an example of a learning request;

FIG. 13 is a diagram showing an example of a scanned image;

FIG. 15 is a diagram showing an example of character recognition results;

FIG. 16 is a diagram showing an example of similar business form determination results;

FIG. 17 is a diagram showing an example of a scanned image;

FIG. 20 is a diagram showing an initial display portion of a preview area;

FIG. 24 is a diagram showing an example of the File name setting screen in a case where a touch operation is performed for a character area; and FIG. 25 is a diagram showing an initial display portion of a preview area in a case where an initial magnification is adjusted.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<System Configuration>

Figure 1:
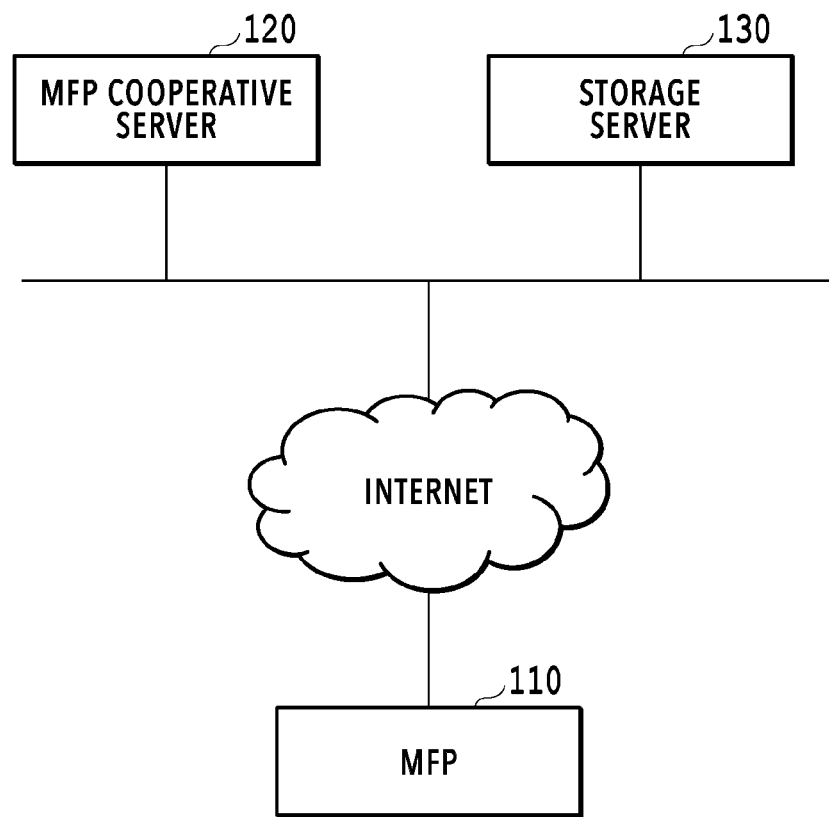
FIG. 1 is a diagram showing an entire configuration of an image processing system.

FIG. 1 is a diagram showing the entire configuration of an image processing system according to the present embodiment. The image processing system includes an MFP (Multifunction Peripheral) 110 and server apparatuses 120 and 130 providing cloud services on the internet. The MFP 110 is connected with the server apparatuses 120 and 130 so as to be capable of communication via the internet.

The MFP 110 is an example of an information processing apparatus having the scan function. The MFP 110 is a multifunction peripheral having a plurality of functions, such as the print function and the BOX save function, in addition to the scan function. Both the server apparatuses 120 and 130 are each an example of an information processing apparatus providing cloud services. The server apparatus 120 of the present embodiment provides cloud services to perform an image analysis for a scanned image received from the MFP 110, transfer a request from the MFP 110 to the server apparatus 130 providing another service, and so on. In the following, the cloud service provided by the server apparatus 120 is called "MFP cooperative service". The server apparatus 130 provides cloud services (hereinafter, called "storage services") to save a file sent via the internet, provide a saved file in response to a request from a web browser, such as a mobile terminal (not shown schematically), and so on. In the present embodiment, the server apparatus 120 that provides the MFP cooperative service is called "MFP cooperative server" and the server apparatus 130 that provides the storage service is called "storage server".

The configuration of an image processing system 100 shown in FIG. 1 is an example and the configuration is not limited to this. For example, the MFP 110 may also have the function of the MFP cooperative server 120. Further, the MFP cooperative server 120 may be connected with the MFP 110 via a LAN (Local Area Network) in place of the internet. Furthermore, it may also be possible to replace the storage server 130 with a mail server that performs a mail distribution service and apply the system to a case of transmitting a scanned image of a document by attaching it to a mail.

<Hardware Configuration of MFP>

Figure 2:
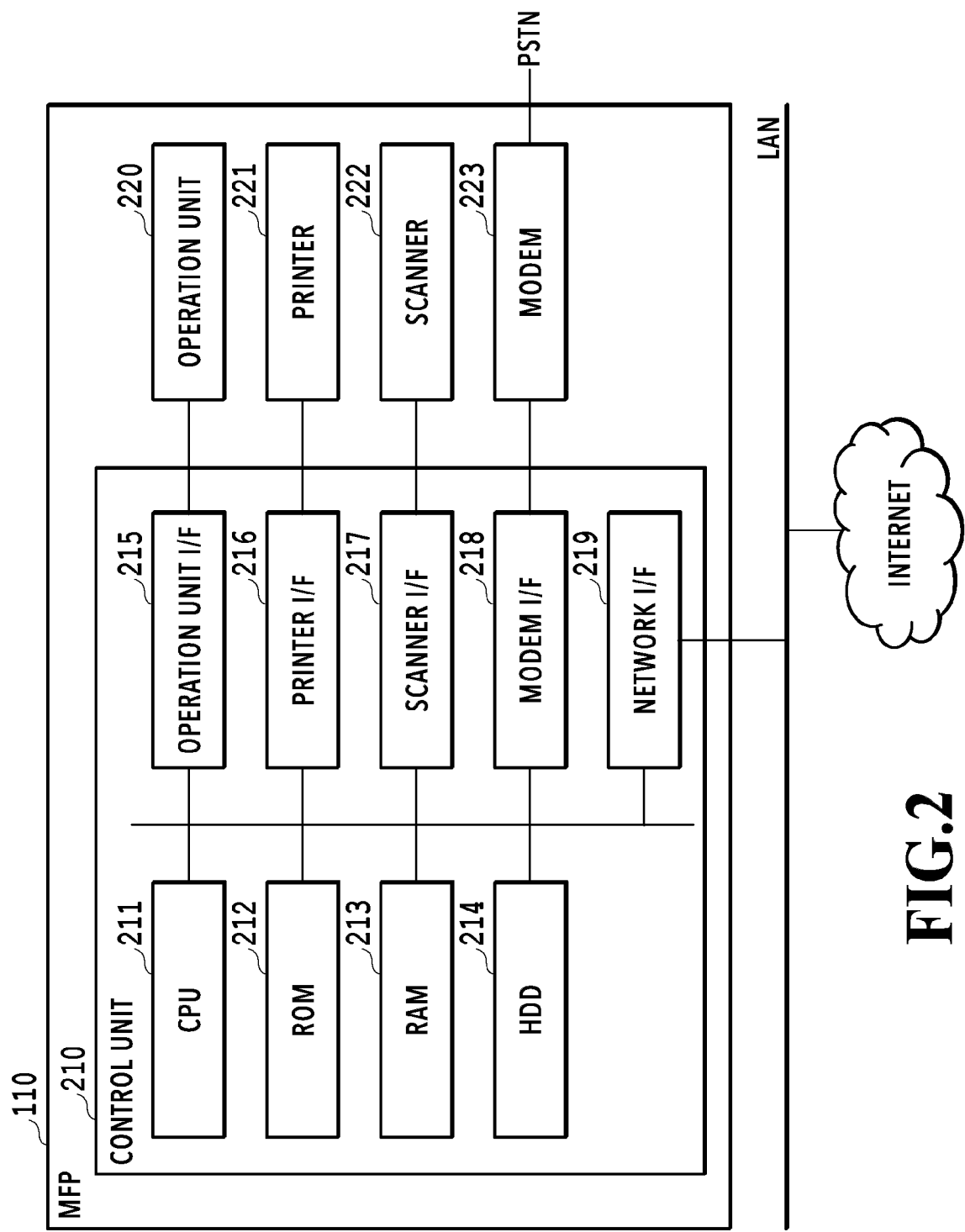
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 221, a scanner unit 222, and a modem 223. The control unit 210 includes each of units 211 to 219 below and controls the operation of the entire MFP 110. The CUP 211 reads various control programs (programs corresponding to various functions shown in the software configuration diagram, to be described later) stored in the ROM 212 and executes the programs. The RAM 213 is used as a temporary storage area, such as a main memory and a work area, of the CPU 211. In present embodiment, the one CPU 211 performs each piece of processing shown in the flowchart, to be described later, by using one memory (RAM 213 or HDD 214), but the embodiment is not limited to this. For example, it may also be possible to perform each piece of processing by causing a plurality of CPUs and a plurality of RAMs or HDDs to cooperate with each other. The HDD 214 is a large-capacity storage unit configured to store image data and various programs. The operation unit I/F 215 is an interface that connects the operation unit 220 and the control unit 210. The operation unit 220 is provided with a touch panel, a keyboard, and the like and receives operations/inputs/instructions by a user. The touch operation to the touch panel includes the operation by a finger of a person and the operation with a touch pen. The printer I/F 216 is an interface that connects the printer unit 221 and the control unit 210. Image data for printing is transferred from the control unit 210 to the printer unit 221 via the printer I/F 216 and printed on a printing medium, such as paper. The scanner I/F 217 is an interface that connects the scanner unit 222 and the control unit 210. The scanner unit 222 optically reads a document that is set on a document table or ADF (Auto Document Feeder), not shown schematically, to generate scanned image data and inputs the data to the control unit 210 via the scanner I/F 217. It is possible to print (copy and output) the scanned image data generated by the scanner unit 222 in the printer unit 221, save the data in the HDD 214, transmit the data as a file to an external apparatus, such as the MFP cooperative server 120, and so on. The modem I/F 218 is an interface that connects the modem 223 and the control unit 210. The modem 223 communicates the image data by a facsimile with a facsimile device (not shown schematically) on PSTN. The network I/F 219 is an interface that connects the control unit 210 (MFP 110) to a LAN. The MFP 110 transmits scanned image data to the MFP cooperative server 120 by using the network I/F 219, receives various kinds of data from the MFP cooperative server 120, and so on. The hardware configuration of the MFP 110 explained above is an example and the hardware configuration may comprise another configuration as needed or may not have a part of the configuration.

<Hardware Configuration of Server Apparatus>

Figure 3:
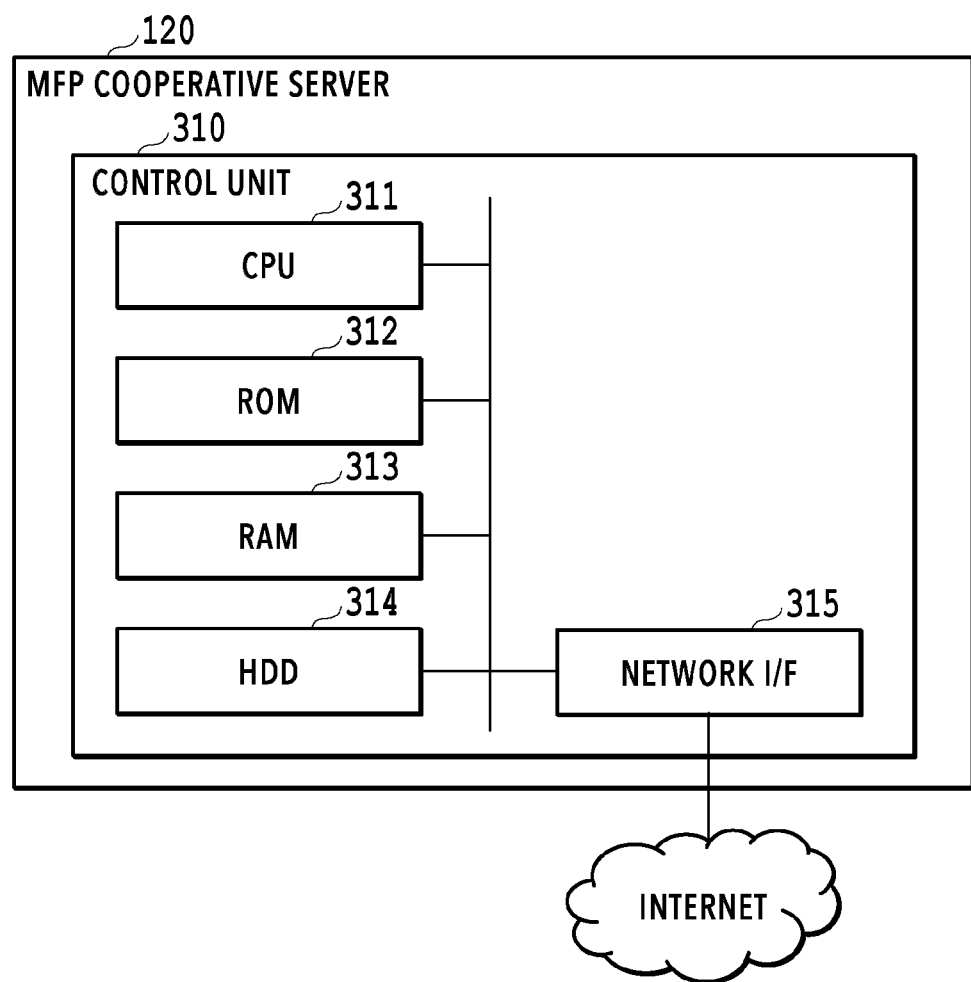
FIG. 3 is a block diagram showing a hardware configuration of an MFP cooperative server and a storage server.

FIG. 3 is a block diagram showing the hardware configuration of the MFP cooperative server 120/the storage server 130. The MFP cooperative server 120 and the storage server 130 have the common hardware configuration including a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects a control unit 310 to the internet. The MFP cooperative server 120 and the storage server 130 receive requests for various kinds of processing from other apparatuses (MFP 110 and the like) via the network I/F 315 and return processing results in accordance with the requests.

<Software Configuration of Image Processing System>

Figure 4:
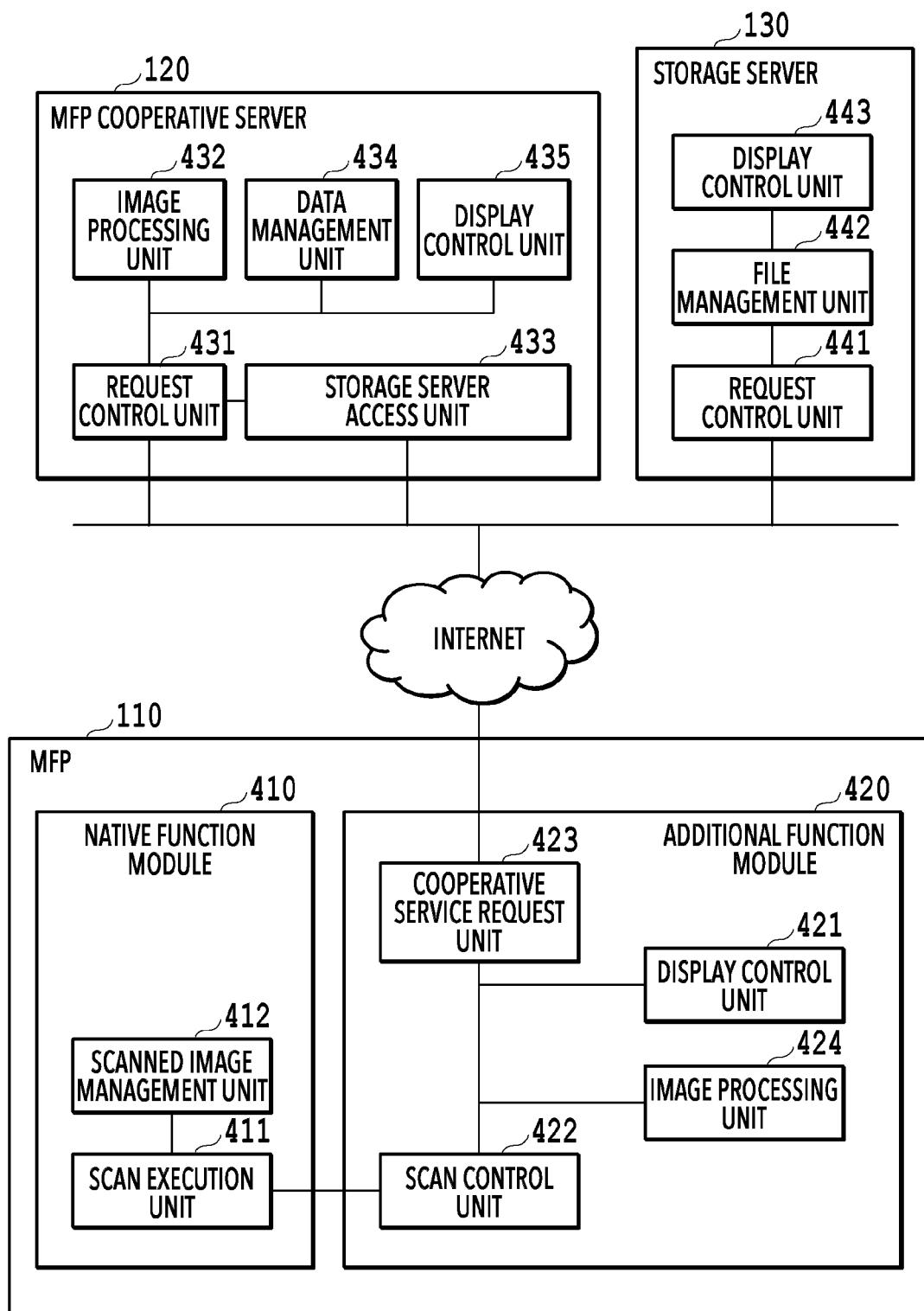
FIG. 4 is a block diagram showing a software configuration of the image processing system.

FIG. 4 is a block diagram showing the software configuration of the image processing system 100 according to the present embodiment. In the following, the software configuration corresponding to the role of each of the MFP 110, the MFP cooperative server 120, and the storage server 130, which configure the image processing system 100, is explained in order. In the following, explanation is given by narrowing the various functions possessed by each apparatus to the functions relating to the processing to scan a document and transform the scanned image into a file, and then save the file in the storage server 130.

<<Software Configuration of MFP>>

The function modules of the MFP 110 are roughly divided into a native function module 410 and an additional function module 420. While the native function module 410 is an application provided as a standard one in the MFP 110, the additional function module 420 is an application that is installed additionally in the MFP 110. The additional function module 420 is an application based on Java (registered trademark) and it is possible to easily implement the addition of a function to the MFP 110. In the MFP 110, another additional application, not shown schematically, may be installed.

The native function module 410 has a scan execution unit 411 and a scanned image management unit 412. Further, the additional function module 420 has a display control unit 421, a scan control unit 422, a cooperative service request unit 423, and an image processing unit 424.

The display control unit 421 displays a user interface screen (UI screen) for receiving various user operations on a touch panel of the operation unit 220. The various user operations include, for example, inputting of log-in authentication information for accessing the MFP cooperative server 120, scan setting, giving of scan start instructions, file name setting, giving of file save instructions, and the like.

The scan control unit 422 gives instructions to perform scan processing to the scan execution unit 411 along with scan setting information in accordance with the user operation (for example, pressing down of "Start scan" button) performed on the UI screen. The scan execution unit 411 causes the scanner unit 240 to perform the document reading operation via the scanner I/F 217 and generates scanned image data in accordance with the instructions to perform scan processing from the scan control unit 422. The generated scanned image data is saved in the HDD 214 by the scanned image management unit 412. At this time, the scan control unit 422 is notified of information on a scanned image identifier uniquely indicating the saved scanned image data. The scanned image identifier is a number, symbol, or alphabet, for uniquely identifying the image scanned in the MFP 110. The scan control unit 422 acquires, for example, the target scanned image data that is transformed into a file from the scanned image management unit 412 by using the above-described scanned image identifier. Then, the scan control unit 422 instructs the cooperative service request unit 423 to make a request for the processing necessary for transforming the scanned image data into a file to the MFP cooperative server 120.

The cooperative service request unit 423 makes requests for various kinds of processing to the MFP cooperative server 120, receives responses thereof, and so on. The various kinds of processing include, for example, log-in authentication, scanned image analysis, scanned image data transmission, and the like. For transmission and reception with the MFP cooperative server 120, the communication protocol, such as REST and SOAP, is used.

The image processing unit 424 generates an image used on the UI screen that is displayed by the display control unit 421 by performing predetermined image processing for scanned image data. Details of the predetermined image processing will be described later.

<<Software Configuration of Server Apparatus>>

First, the software configuration of the MFP cooperative server 120 is explained. The MFP cooperative server 120 has a request control unit 431, an image processing unit 432, a storage server access unit 433, a data management unit 434, and a display control unit 435. The request control unit 431 stands by in the state of being capable of receiving a request from an external apparatus and instructs the image processing unit 432, the storage server access unit 433, and the data management unit 434 to perform predetermined processing in accordance with received request contents. The image processing unit 432 performs image modification processing, such as rotation and inclination correction, in addition to image analysis processing, such as character area detection processing, character recognition processing, and similar document determination processing, for scanned image data that is sent from the MFP 110. The storage server access unit 433 makes a request for processing to the storage server 130. The cloud service discloses a variety of interfaces for saving files in the storage server, for acquiring saved files, and so on, by using the protocol, such as REST and SOAP. The storage server access unit 433 makes a request to the storage server 130 by using the disclosed interface. The data management unit 434 stores and manages user information, various kinds of setting data, and the like, which are managed in the MFP cooperative server 120. The display control unit 435 receives a request from the web browser running on a PC or a mobile terminal (neither of them is shown schematically) connected via the internet and returns screen configuration information (HTML, CSS, and the like) that is necessary for the screen display. It is possible for a user to check the registered user information, change the scan setting, and so on, via the screen displayed on the web browser.

Next, the software configuration of the storage server 130 is explained. The storage server 130 has a request control unit 441, a file management unit 442, and a display control unit 443. The request control unit 441 stands by in the state of being capable of receiving a request from an external apparatus and in the present embodiment, instructs the file management unit 442 to save the received file and read the saved file in accordance with a request from the MFP cooperative server 120. Then, the request control unit 441 returns a response in accordance with the request to the MFP cooperative server 120. The display control unit 443 receives a request from a web browser running on a PC or a mobile terminal (neither of them is shown schematically) connected via the internet and returns screen configuration information (HTML, CSS, and the like) that is necessary for the screen display. It is possible for a user to check and acquire the saved file, and so on, via the screen that is displayed on the web browser.

<Flow of Processing of Entire Image Processing System>

Figure 5:
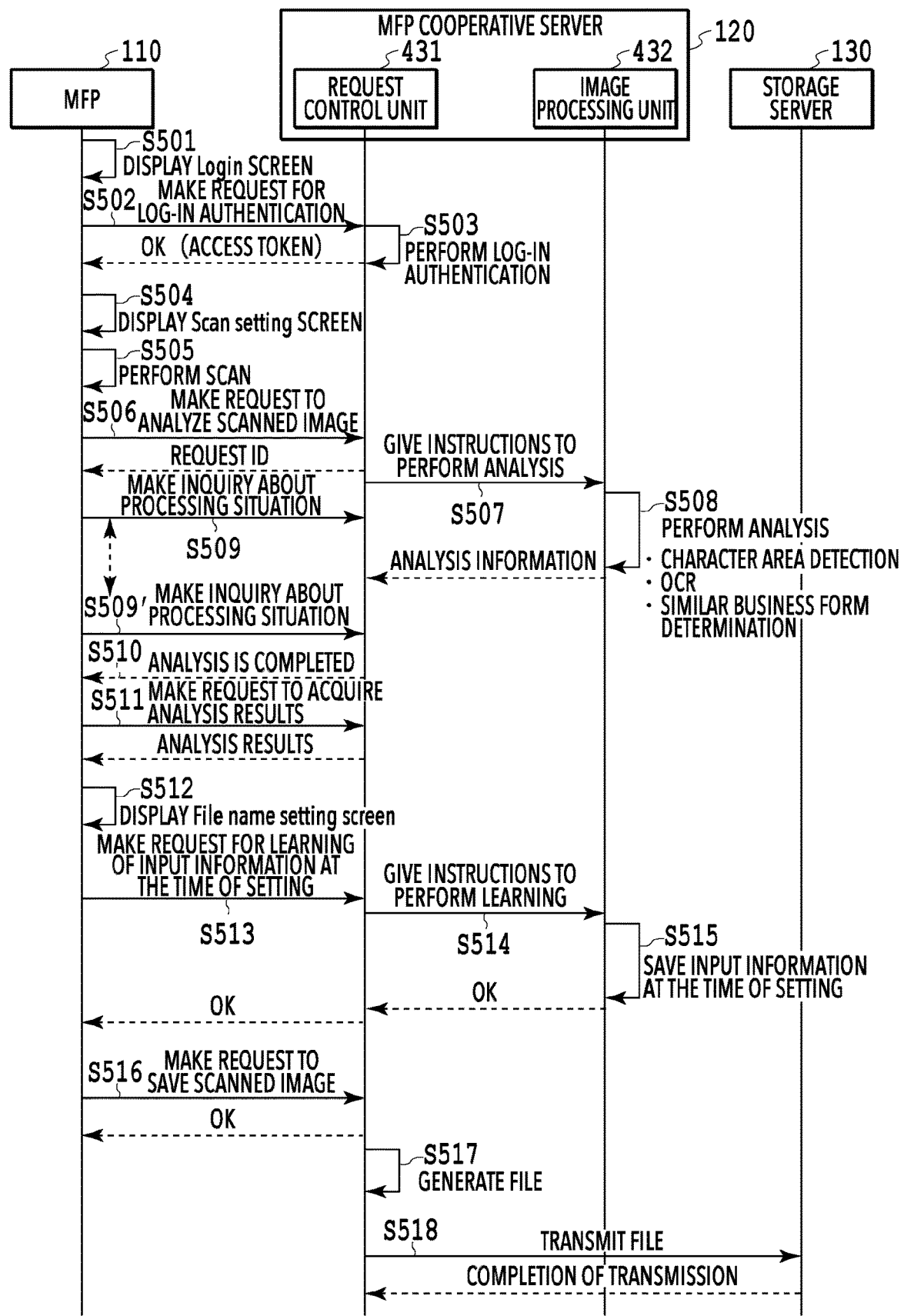
FIG. 5 is a sequence diagram showing a flow of processing of the entire image processing system.
Figure 6:
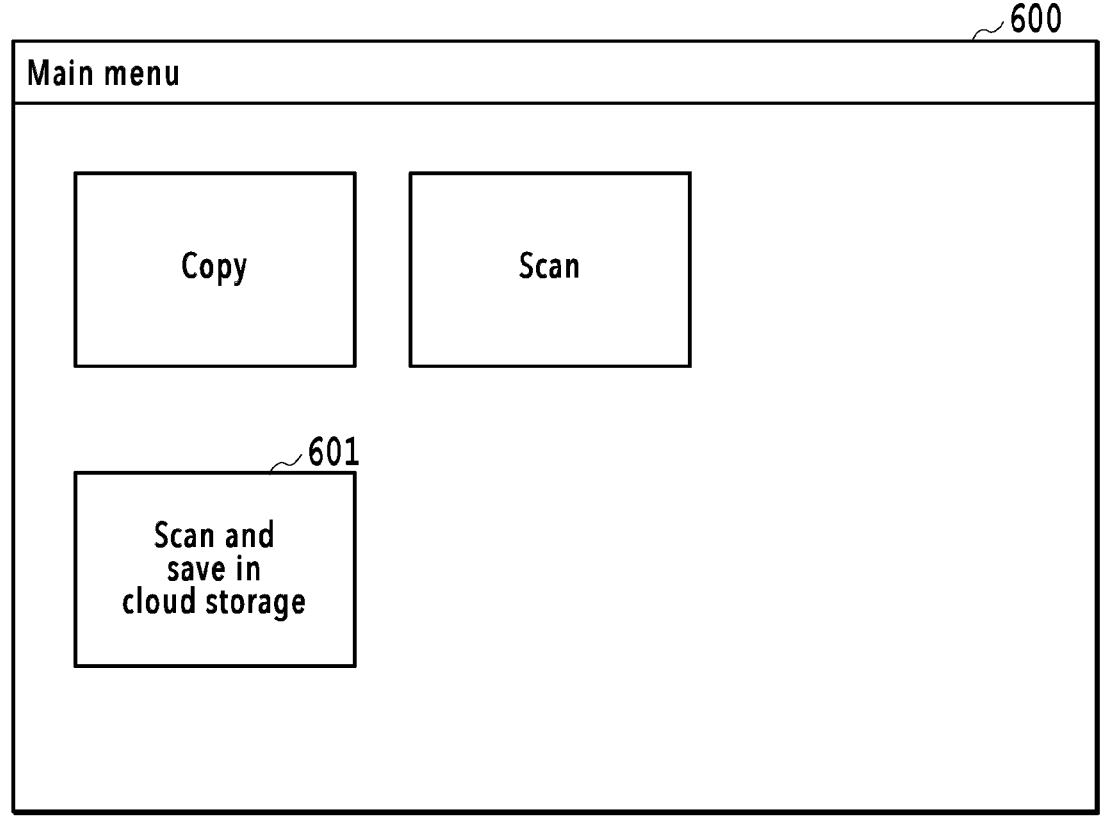
FIG. 6 is a diagram showing an example of a Main menu screen.

FIG. 5 is a sequence diagram of a flow of processing among the apparatuses at the time of scanning a document in the MFP 110, transforming the obtained scanned image into a file, and saving the file in the storage server. FIG. 6 is a diagram showing an example of a UI screen of a Main menu (hereinafter described as "Main screen") that is displayed at the time of the activation of the MFP 110. By scanning a document and transforming the scanned image into a file and installing a dedicated application necessary to use the cloud storage service in the MFP 110, a "Scan and save in cloud storage" button 601 is displayed on a Main screen 600. Then, in a case where a user presses down the "Scan and save in cloud storage" button 601 among the menu buttons displayed within the Main screen 600, the series of processing shown in the sequence diagram in FIG.

5 starts. In the following, in accordance with the sequence diagram in FIG. 5, the operations among the apparatuses are explained in a time series. In the following explanation, symbol "S" represents a step.

Figure 7:
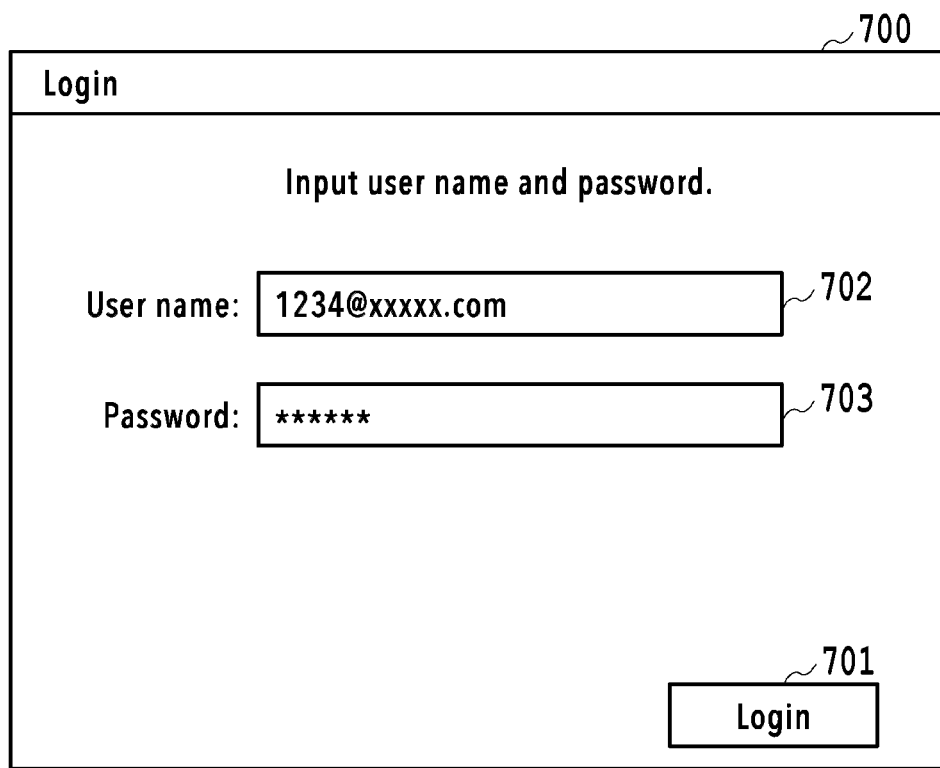
FIG. 7 is a diagram showing an example of a Login screen.

The MFP 110 displays a UI screen (hereinafter, described as "Login screen") on which to input information on log-in authentication for accessing the MFP cooperative server 120 on the operation unit 220 (S501). FIG. 7 shows an example of a Login screen. In a case where a user inputs a user ID and a password, which are registered in advance, in input fields 702 and 703, respectively, on a Login screen 700 and presses down a "Login" button 701, a request for log-in authentication is transmitted to the MFP cooperative server 120 (S502).

The MFP cooperative server 120 having received the request for log-in authentication performs authentication processing by using the user ID and the password, which are included in the request (S503). In a case where it is checked that the user is a genuine user by the results of the authentication, the MFP cooperative server 120 returns an access token to the MFP 110. After this, by sending this access token together at the time of various requests made by the MFP 110 to the MFP cooperative server 120, a log-in user is specified. In the present embodiment, it is assumed that at the same time the login to the MFP cooperative server 120 is completed, the login to the storage server 130 is also completed. Because of this, a user performs in advance association between the user ID for using the MFP cooperative service and the user ID for using the storage service via a web browser or the like of the PC (not shown schematically) on the internet. Due to this, in a case where the log-in authentication to the MFP cooperative server 120 succeeds, the log-in authentication to the storage server 130 is also completed at the same time and it is possible to omit the operation to log in to the storage server 130. Then, it is made possible for the MFP cooperative server 120 to deal with a request relating to the storage service from a user who has logged in to the MFP cooperative server 120. Generally, it is possible to perform the log-in authentication method by using a publicly known method (Basic authentication, Digest authentication, authentication using OAuth, and the like).

Figure 8:
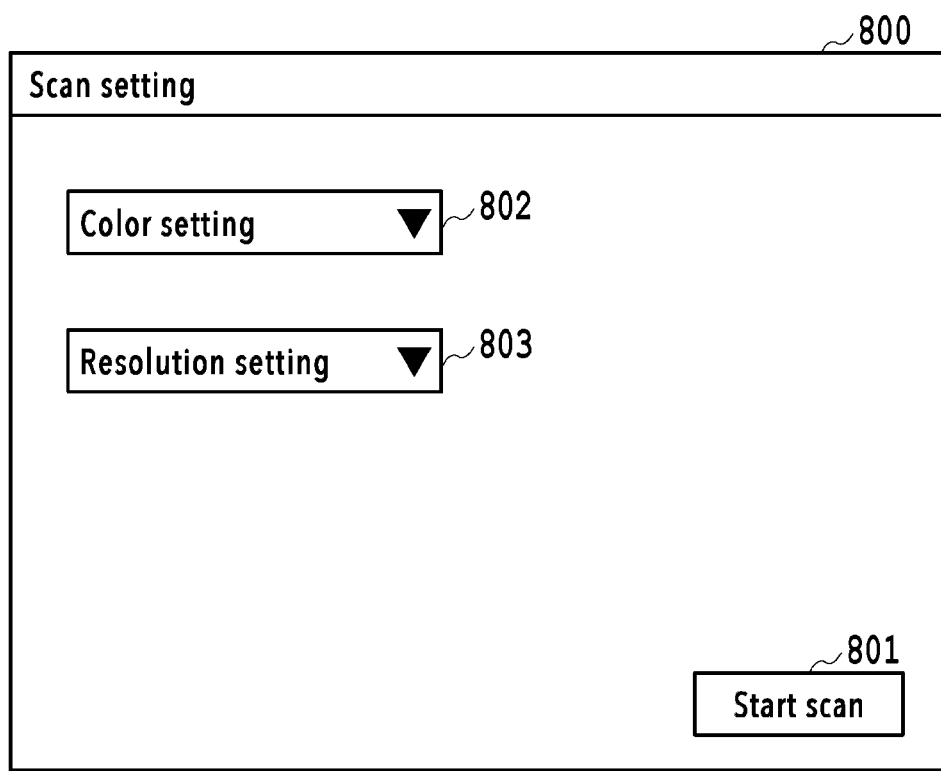
FIG. 8 is a diagram showing an example of a Scan setting screen.

In a case where login is completed, the MFP 110 displays a UI screen for scan setting (hereinafter, described as "Scan setting screen") on the operation unit 220 (S504). FIG. 8 shows an example of a Scan setting screen. On a Scan setting screen 800, a "Start scan" button 801, a Color setting field 802, and a Resolution setting field 803 exist. The "Start scan" button 801 is a button for giving instructions to start scan processing for a document (in the present embodiment, a business form, such as an estimation form and a bill, is supposed) that is set on the document table. In the Color setting field 802, a color mode at the time of scan is set. For example, the Color setting field 802 is designed so that it is possible to specify the color mode from alternatives, for example, such as full color and monochrome. In the Resolution setting field 803, the resolution at the time of scan is set. The Resolution setting field 803 is designed so that it is possible to specify the resolution from alternatives, for example, such as 600 dpi and 1,200 dpi. The setting items of the color mode and the resolution are merely exemplary and all of these items do not need to exist or another setting item other than those may exist. Further, it may also be possible to limit the alternatives relating to the color mode and the resolution only to the setting values required by the storage service. A log-in user performs detailed condition setting for the scan processing via the Scan setting screen 800 such as this. In a case where a user who has completed the scan setting sets a scan-target document on the document table of the MFP 110 and presses down the "Start scan" button 801, the scan is performed (S505). Due to this, image data obtained by computerizing a paper document is generated. After the completion of the scan, the MFP 110 transmits the image data obtained by the scan to the MFP cooperative server 120 along with the analysis request thereof (S506).

In the MFP cooperative server 120 having received the request to analysis the scanned image, the request control unit 431 instructs the image processing unit 432 to perform image analysis processing (S507). At that time, the request control unit 431 returns a request ID capable of uniquely specifying the received analysis request to the MFP 110. FIG. 9A shows an example of the request ID. On the other hand, the image processing unit 432 having received the instructions to perform analysis processing performs the analysis processing for the scanned image (S508). In this image analysis processing, first, processing to detect the character area (text block) existing within the scanned image is performed. For the detection of the character area, it is possible to apply an already-known method, for example, such as a method of extracting a rectangular area that is predicted as a character from the image for which binarization has been performed with a certain threshold value. Next, optical character recognition (OCR) is performed for each character area detected by the character area detection processing. Then, processing to determine whether the scan-target business form of this time is similar to the past scan-target business form is performed (similar document determination processing). The determination of the similar business form uses arrangement information indicating which position of the scanned image each character area existing within the scanned image is located at. Specifically, the arrangement information about the past scanned image and the arrangement information about the scanned image of this time are compared and whether the arrangement of the character area is similar is determined. This is based on the fact that in a case where the arrangement of the character area is similar, it is possible to predict that the business forms are created by using the same format. The arrangement information on the past scanned image, which is used for the determination of the similar business form, is accumulated by "business form learning processing", to be described later. The results obtained by the image analysis processing are delivered to the request control unit 431. In the present embodiment, the similarity between the business forms is determined based on only the similarity between the arrangements of the character areas, but for example, it may also be possible to specify the type of the business form (estimation form, bill, and the like) based on the OCR results and determine the similarity by taking into consideration the obtained type information.

While the above-described image analysis processing is in progress, the MFP 110 makes an inquiry about the processing situation periodically (for example, every hundreds of milliseconds to every several milliseconds) to the MFP cooperative server 120 by using the above-described request ID (S509 to S509'). This inquiry is made repeatedly until the completion response of the image analysis processing from the MFP cooperative server 120 is acquired (S510). Upon receipt of the inquiry about the processing situation, the MFP cooperative server 120 checks the progress situation of the image analysis processing corresponding to the request ID and returns a response (see FIG. 9B) indicating that the processing is in progress in a case where the image analysis processing is not completed yet. In a case where the image analysis processing is completed, the MFP cooperative server 120 returns a response (see FIG. 9C) indicating the image analysis processing is completed. In "status" of this response, a character string indicating the current processing situation is input, specifically, in a case where the processing is in progress in the MFP cooperative server 120, "processing" is input and in a case where the processing is completed, "completed" is input. There is a case where a character string indicating another status is input, such as "failed" on a condition that the processing has failed. As shown in FIG. 9C, in the response at the time of completion of the processing, in addition to the status information, information relating to the analysis results of the scanned image and the like are included.

After receiving the processing completion response, the MFP 110 makes a request for the results of the image analysis processing to the MFP cooperative server 120 by using the URL indicating the storage destination of the image analysis results, which is included in the response (S511). As the URL in this case, there are "ocrResultUrl" and "matchingResultUrl". Upon receipt of the request, the request control unit 431 of the MFP cooperative server 120 returns results information on the image analysis processing.

Then, the MFP 110 displays a UI screen (hereinafter, described as "File name setting screen") for setting a file name by using the acquired results information (S512). FIG. 10 shows an example of a File name setting screen. In a case where a user sets a file name and presses down a Transmit button 1007, the MFP 110 first transmits a learning request including information (input information at the time of setting) relating to the input operation performed by a user at the time of setting the file name to the MFP cooperative server 120 (S513). FIG. 11 shows an example of the learning request. The learning contents are specified in "learningContent" and in which there are "rectInfoArray" relating to the character area used for the file name and "metadataArray" relating to metadata. In "rectInforArray", the coordinate information on the character area used at the time of the file name setting is input. In "metadataArray", the information on the character area corresponding to the character string used for the file name and the information on the separator attached to the character string are input. The example in FIG. 11 indicates that the file name configuration is such that the front is the character string of the character area of "fileRegion0", the next is the separator, and the end is the character string of the character area of "fileRegion1" and these are arranged in this order.

In the MFP cooperative server 120 having received the learning request, the request control unit 431 instructs the image processing unit 432 to perform business form learning processing (S514). Upon receipt of the instructions, the image processing unit 432 saves the arrangement information on each character area existing in the scanned image and the input information (file name configuration information) at the time of the file name setting included in the learning request received at S513.

After that, the MFP 110 transmits a request to save the scanned image to the MFP cooperative server 120 along with the scanned image data and the information, such as the file name set at the time of being transformed into a file (S516). In the MFP cooperative server 120 having received the save request, the request control unit 431 returns a response to the MFP 110, which indicates that the save request has been received normally, as well as starting file generation processing. The MFP 110 having received the response terminates the processing and the state returns to the state where the Scan setting screen is displayed (S504).

On the other hand, the MFP cooperative server 120 acquires information on the file format from the scan setting registered in advance and transforms the scanned image into a file in accordance with the file format (S517). At this time, to the generated file, the file name specified in the save request is attached. The scanned image file thus generated is transmitted to and saved in the storage server (S518).

The above is the flow of the processing of the entire image processing system.

<Details of Processing of MFP>

Figure 12:
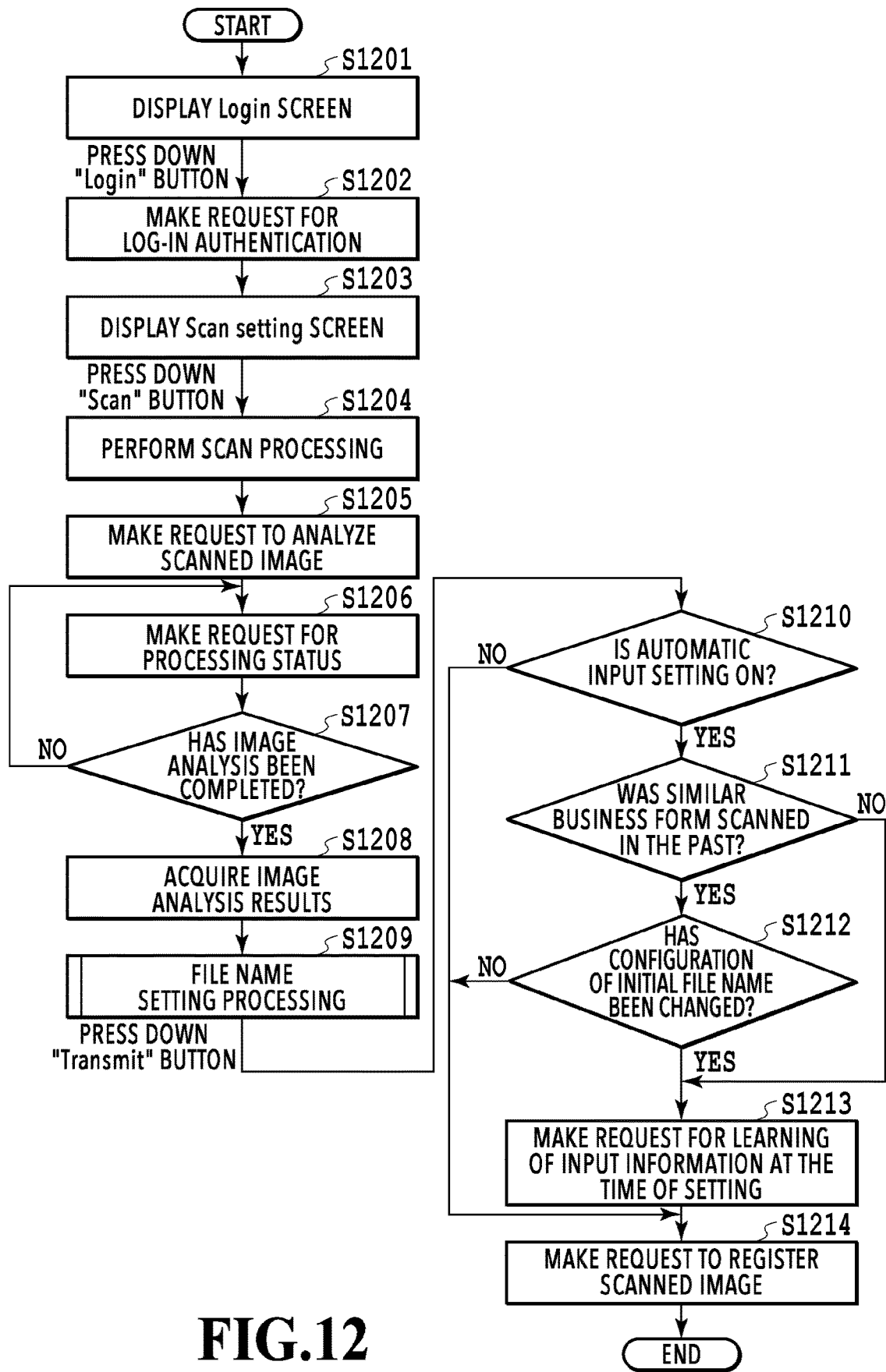
FIG. 12 is a flowchart showing a flow of processing in the MFP.

Following the above, by focusing attention on the operation in the MFP 110, processing in a case where the storage service is used in the above-described image processing system is explained in detail. FIG. 12 is a flowchart showing a flow of processing in the MFP 110. The series of processing is implemented by the CPU 211 executing the control program stored in the HDD 214 in the control unit 210 and started in response to the pressing down of the "Scan and save in cloud storage" button 601 on the Main screen 600 described previously. In the following, detailed explanation is given along the flowchart shown in FIG. 12. Symbol "S" at the top of each piece of processing means a step.

At S1201, the display control unit 421 displays the Login screen 700 described previously. In a case where a user name and a password are input to the input fields 702 and 703, respectively, on the Login screen 700 and the pressing down of the "Login" button 701 is detected, the processing advances to S1202.

At S1202, the cooperative service request unit 423 transmits a request for log-in authentication to the MFP cooperative server 120. In a case where it is checked that the user is a genuine user by the log-in authentication in the MFP cooperative server 120, the cooperative service request unit 423 receives an access token from the MFP cooperative server 120.

At S1203, in the MFP 110 having received the access token, the display control unit 421 displays the Scan setting screen 800 described previously on the operation unit 220. In a case where a document is set on the document table by the log-in user and the pressing down of the "Start scan" button 801 is detected, the display control unit 421 notifies the scan control unit 422 of that.

At S1204, the scan control unit 422 having received the above-described notification instructs the scan execution unit 411 to perform the scan processing. Upon receipt of the instructions, the scan execution unit 411 scans the document placed on the document table. In the explanation of this flow, it is assumed that explanation is given by taking a business form (more specifically, an estimation form) as an example of the scan target. Due to this, the scanned image of an estimation form as shown in FIG. 13 is obtained. The scanned image data generated by the scan is saved in the scanned image management unit 412 and the display control unit 421 is notified of the identifier capable of specifying the scanned image. At this time, it may also be possible to display a message screen (not shown schematically) indicating that the scan is in progress on the operation unit 220.

Next, at S1205, the cooperative service request unit 423 acquires the scanned image data via the scan control unit 422 and transmits the scanned image data to the MFP cooperative server 120 along with the analysis request. In the MFP cooperative server 120, based on the analysis request, the image analysis processing described previously is performed for the received scanned image data. At that time, a request ID is returned from the request control unit 431 of the MFP cooperative server 120.

At S1206, the cooperative service request unit 423 having acquired the request ID transmits an acquisition request for the processing status to the MFP cooperative server 120 along with the request ID. Based on the acquisition request, the MFP cooperative server 120 returns a response in accordance with the progress situation of the image analysis processing specified by the request ID to the MFP 110.

At S1207, the cooperative service request unit 423 returns to S1206 in a case where the status in the received response is "processing" indicating that the processing is in progress. Then, after waiting until a predetermined time elapses, the cooperative service request unit 423 transmits the acquisition request for the processing status again to the MFP cooperative server 120. In a case where the status in the received response is "completed" indicating that the processing is completed, the processing advances to S1208. Here, the information on the image analysis results included in the response at the time of completion of the processing in the present embodiment is explained with reference to FIG. 9C described previously. As the information on the image analysis results, there are three kinds of information: "ocrResultUrl", "matchingResultUrl", and "formKeys". The information "ocrResultUrl" is information on the URL for acquiring the results of the OCR processing of the image analysis processing. The information "matchingResultUrl" is information on the URL for acquiring the results of the similar business form determination processing of the image analysis processing. The information "formKeys" is information on the setting value for setting a property, such as the file name, the metadata, and the folder path, to a scanned image and is set in advance in the MFP cooperative server 120. In "formKeys", the following information is included.

key: value uniquely indicating the setting value that is set to a scanned image keyType: value indicating the type of the setting value of key value: initial value of the setting value (for example, "scan" indicating a scanned image)

type: value indicating the kind of value that is input to the setting value (for example, "string" for character string, "number" for numerical value, "date" for date, and the like)

displayName; display name in a case where the setting screen is displayed on the touch panel of MFP required: value indication whether input of the setting value is indispensable multiSelect: value indicating whether character strings of a plurality of character areas are used for the file name separator: contents of the separator connecting character strings in a case where character strings of a plurality of character areas are used autoInput: value indicating whether automatic input of the initial file name is performed.

Figure 14:
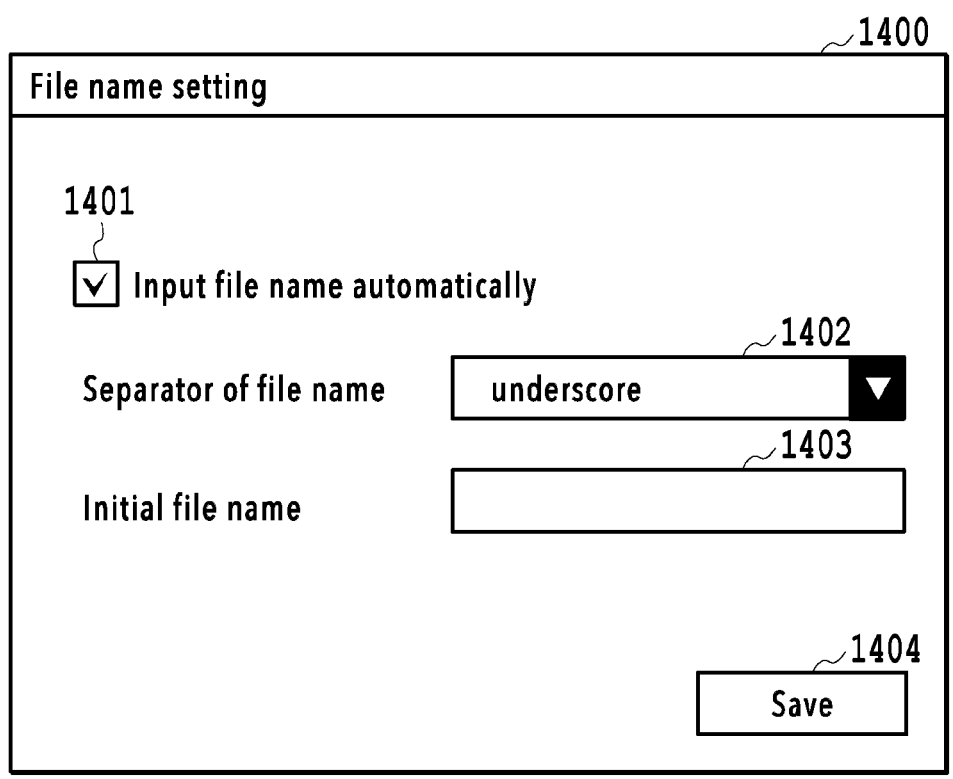
FIG. 14 is a diagram showing an example of a File name condition setting screen.
Figure 18A:
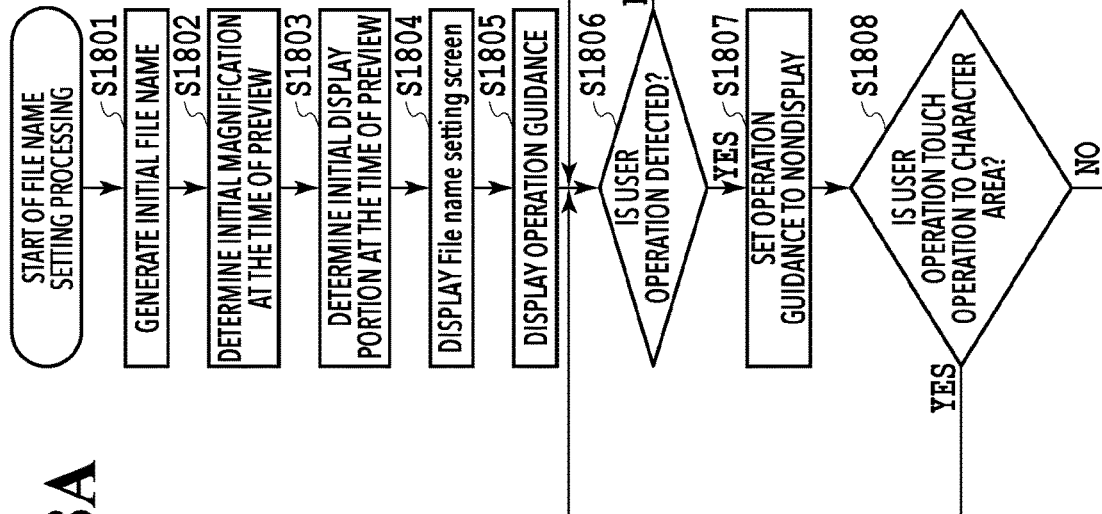
FIG. 18 is a diagram showing a relationship between FIGS. 18A and 18B, and FIGS. 18A and 18B are flowcharts showing a flow of file name setting processing in the MFP.
Figure 18B:
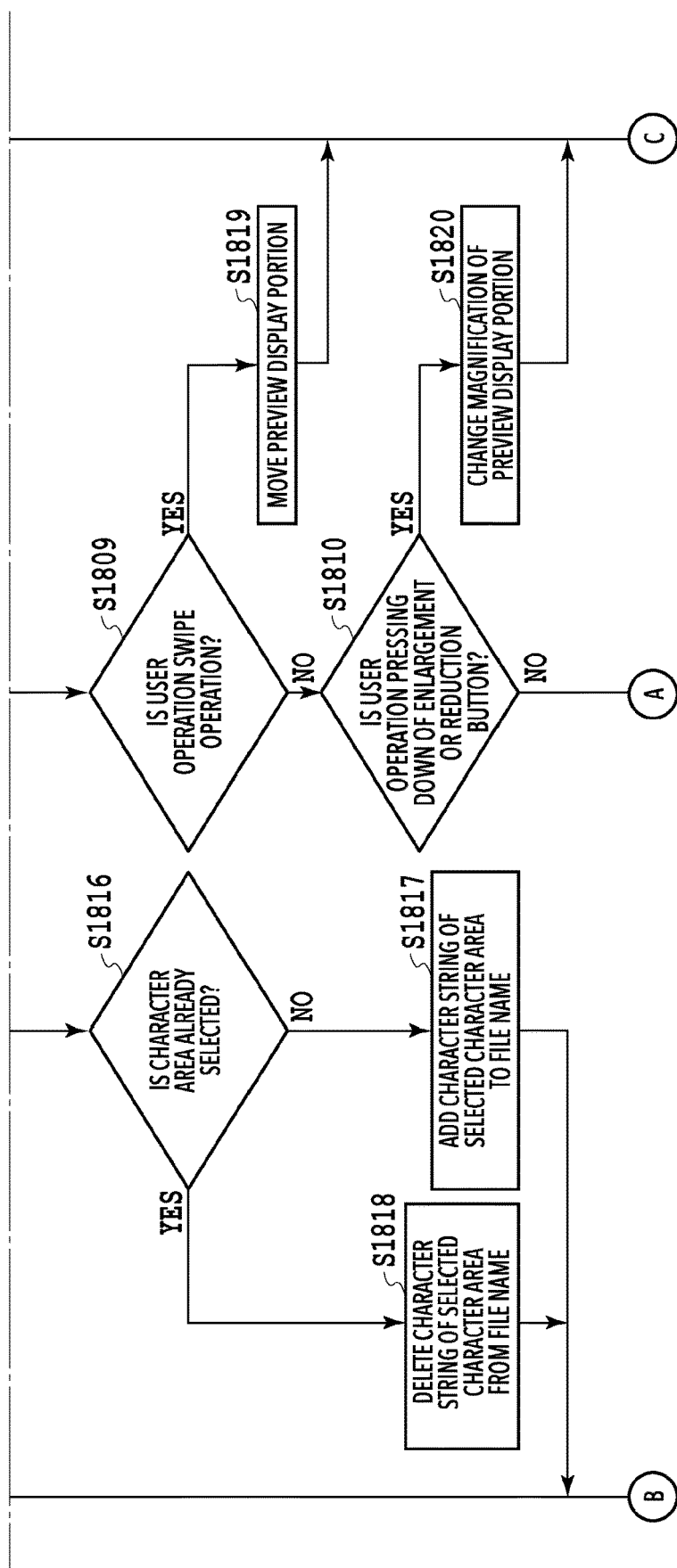
Figure 19B:
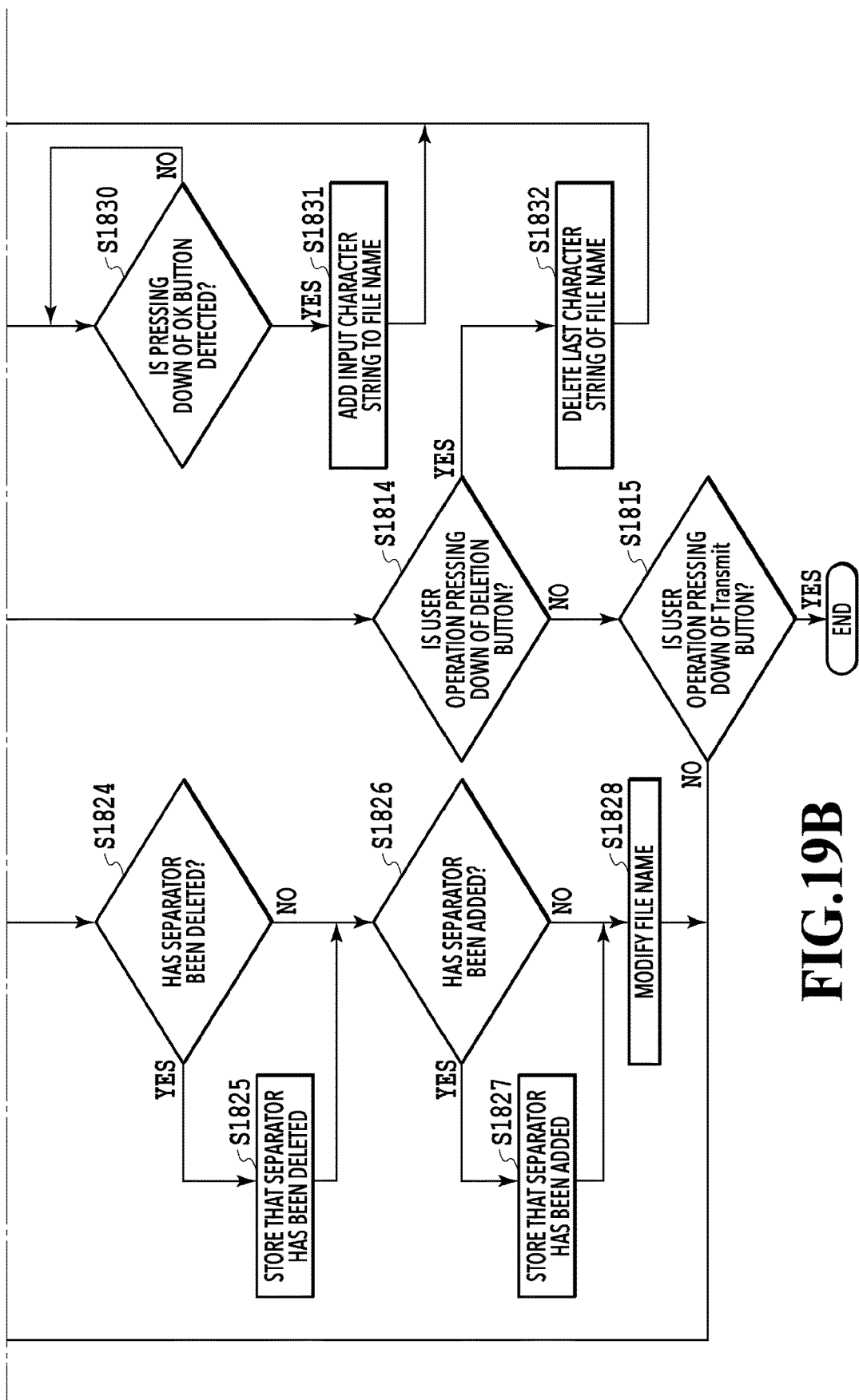
FIG. 19 is a diagram showing a relationship between FIGS. 19A and 19B, and FIGS. 19A and 19B are flowcharts showing a flow of file name setting processing in the MFP.

In FIG. 9C, "formKeys" in a case where a file name is set to a scanned image is shown. By taking the case of FIG. 9C as an example, how each value of "value", "displayName", "required", and "multiSelect" affects the File name setting screen (FIG. 10) that is displayed at next S1209 is explained. Now, the contents of "value" are empty. In this case, in a file name input field 1001 on a File name setting screen 1000, no initial value is displayed. Further, "displayName" is "file name". In this case, as in the case with the File name setting screen 1000 in FIG. 10, the character string of "file name" indicating the title or the label of the setting is displayed at the upper portion of the screen (in this example, by outline characters on a colored background). Further, "required" is "true". In this case, in the state where no character string is input in the file name input field 1001, it is no longer possible to press down a Transmit button 1007. Further, "multiSelect" is "true". In this case, it is made possible to select a plurality of character areas detected from a scanned image, and therefore, it is possible to set a file name connecting the character string corresponding to each character area. The above-described contents included in "formKeys" are set by a user via a File name condition setting screen that is displayed by the display control unit 435 of the MFP cooperative server 120. FIG. 14 shows an example of a File name condition setting screen. A checkbox 1401 within a File name condition setting screen 1400 is used by a user for selecting whether or not to automatically input a file name by using the information on the character area used at the time of file name setting of a scanned image before. In a setting field 1402, the separator that is inserted between character strings is set among alternatives (underscore, hyphen, and the like) displayed in a pull-down list in a case where a plurality of character strings corresponding to a plurality of character areas is used for the file name. Here, the underscore is selected. A setting field 1403 is brought into the input state in advance at the time of initial display of the File name setting screen (FIG. 10) and the character string (initial file name) that is presented to a user as the candidate of the file name is set. The contents that are set on this File name condition setting screen 1400 are stored in the data management unit 434 and referred to in a case where the response at the time of completion of the processing is created.

At S1208, the cooperative service request unit 423 accesses the URL included in the response at the time of completion of the processing and acquires the image analysis results. In the example in FIG. 9C, information is stored in "ocrResultUrl" and "matchingResultUrl", and therefore, the cooperative service request unit 423 accesses these two URLs and acquires the image analysis results. The following Table 1 shows the coordinates of the character area detected from the scanned image in FIG. 13 and the character recognition results (recognized character string) of each character area.

TABLE 1

| No. | X-coordinate of area | Y-coordinate of area | Width of area | Height of area | Character string within area |
|---|---|---|---|---|---|
| 1 | 1019 | 303 | 489 | 95 | Estimation form |
| 2 | 261 | 446 | 243 | 43 | 〒100-9999 |
| 3 | 1584 | 446 | 262 | 36 | Estimation No.: |
| 4 | 1874 | 443 | 230 | 47 | R12-3456 |
| 5 | 255 | 531 | 798 | 47 | B-B-B, Minato-ku, Tokyo |
| 6 | 1671 | 530 | 165 | 44 | Date of issue: |
| 7 | 1872 | 527 | 259 | 54 | 2017 Sep. 10 |
| 8 | 406 | 626 | 594 | 71 | Shinagawa Inc. |
| 9 | 1164 | 636 | 112 | 55 | To |
| 10 | 456 | 1186 | 105 | 55 | Item |
| 11 | 1102 | 1188 | 100 | 55 | Unit price |
| 12 | 1510 | 1188 | 101 | 55 | Quantity |
| 13 | 2043 | 1187 | 113 | 57 | Amount |
| 14 | 400 | 1356 | 230 | 45 | GF-1544 |
| 15 | 1023 | 1358 | 180 | 45 | 11,550 |
| 16 | 1562 | 1358 | 27 | 46 | 3 |
| 17 | 2023 | 1358 | 182 | 51 | 34,650 |
| 18 | 398 | 1447 | 230 | 54 | EF24-70 |
| 19 | 1003 | 1448 | 203 | 47 | 134,100 |
| 20 | 1572 | 1448 | 10 | 47 | 1 |
| 21 | 2003 | 1448 | 204 | 47 | 134,100 |
| 22 | 1517 | 2038 | 128 | 63 | Total |
| 23 | 1950 | 2042 | 250 | 58 | 168,750 |
| 24 | 972 | 2770 | 581 | 72 | Kawasaki Inc. |
| 25 | 1167 | 2925 | 615 | 43 | 2-2-2, Yokohama-shi Kanagawa prefecture |

Then, FIG. 15 shows the character recognition results for the scanned image in FIG. 13, which are acquired by accessing "ocrResultUrl". Here, "imageWidth" indicates the number of pixels in the X-direction (transverse direction) of the analysis-target scanned image and "imageHeight" indicates the number of pixels in the Y-direction (longitudinal direction) of the analysis-target scanned image. In "regions", coordinate information ("rect") on the character area detected from the scanned image and character string information ("Text") corresponding to the character area are included. In "rect", information specifying the detected character area is included, "x" indicates the X-coordinate of the top-left corner of the character area, "y" indicates the Y-coordinate of the top-left corner of the character area, "width" indicates the number of pixels in the X- (width) direction of the character area, and "height" indicates the number of pixels in the Y- (height) direction of the character area. Then, "text" indicates information on the character string obtained by performing the OCR processing for the character area specified by "rect". The information "rect" and "text" is included so as to correspond to all the character areas detected within the analysis-target scanned image. However, in FIG. 15, part thereof is omitted.

Then, FIG. 16 shows the similar business form determination results for the scanned image in FIG. 13, which are acquired by accessing "matchingResultUrl". In "matched", "true" or "false" is input as the value indicating whether a scanned image similar to the analysis-target scanned image of this time is found among the past scanned images by the similar business form determination processing described previously. A case where the value is "true" indicates that the scan-target business form of this time is similar to the business form scanned before and a case of "false" indicates that the scan-target business form of this time is not similar to the business form scanned before. In "formID", a value (ID value) uniquely indicating the scanned image of the past similar business form is input in a case where a similar business form is found. On the other hand, in a case where a similar business form is not found, an ID value created newly is input, which uniquely indicates the scanned image of the business form for which the scan has been performed this time. Then, the ID value created newly is used in a case where the input information (configuration information on the file name) at the time of the file name setting for the scanned image of the business form for which no similar business form existed in the past is caused to be learned. In "matchingScore", a value indicating the matching rate in a case where there is a similar business form. The similarity of the present embodiment represents the matching rate between the arrangement information on the character area in the past scanned image and the arrangement information on the character area in the scanned image of this time by a real number value between 0 and 1, and it is indicated that the larger the value, the more similar they are. In "rectInfoArray", information indicating the character area in the analysis-target scanned image of this time is input, which corresponds to the character area used at the time of the file name setting for the scanned image of the past similar business form.

In a case of the example in FIG. 16, for the scanned image in FIG. 13, which is obtained by scanning an estimation form, the file name is set by using two character strings, that is, "Estimation form" and "Shinagawa Inc." and learning of the input information is performed. After that, an estimation form created with the same format is scanned and the scanned image shown in FIG. 17 is generated, and as a result of performing the similar business form determination processing for the scanned image, it is determined that the scanned image is similar to the scanned image in FIG. 13. Then, the example in FIG. 16 shows the state where the information on the character area used at the time of file name setting for the scanned image in FIG. 13 is stored as the information on the automatic input-target character area. In the following, the process until the results of the similar business form determination processing shown in FIG. 16 are obtained is explained.

As the premise, it is assumed that the learning results based on the learning request in FIG. 11 described previously are saved in the data management unit 434. Then, in the similar business form determination processing, by using the coordinate information on the character areas of "Estimation form" and "Shinagawa Inc." used at the time of the previous file name setting, the character area whose part overlaps the character area indicated by the coordinate information among the character areas included in the scanned image of this time is specified. Then, the coordinate information on the character area whose part is specified to overlap and the character string of the character area are stored in "text" of "rectInfoArray". In "key", a value uniquely indicating the character area used for the automatic input of the file name is input. In "region", the coordinate information on the character area uniquely indicated by "key" and the character string obtained by the OCR processing for the character area are stored. Then, in "rect", the information specifying the character area uniquely indicated by "key" is included. In this case, "x" indicates the X-coordinate of the top-left corner of the character area, "y" indicates the Y-coordinate of the top-left corner of the character area, "width" indicates the number of pixels in the X- (width) direction of the character area, and "height" indicates the number of pixels in the Y- (height) direction of the character area. Then, the information on the character string obtained by performing the OCR processing for the character area specified by "rect" is input in "text". In "metadataArray", the order of the character areas used at the time of automatically inputting a file name and information indicating where the separator is inserted are stored. In a case where property information, such as metadata, is set in addition to a file name, in "rectInfoArray" and "metadataArray", necessary information is added. In "key", a value uniquely indicating the setting value that is set to the scanned image is stored. In "keyType", a value indicating the type of the setting value of "key" is stored. In a case of being used for a file name, in "key", "filename" is input and in "keyType", "filename" is input. In "value", the character area used for the value of "key" and the information on the separator are stored. In the example in FIG. 16, the character string of the character area having "key" of "fileRegion0" in "rectInfoArray" is the first, the separator is the second, and the character string of the character area having "key" of "fileRegion1" is the third. Then, in this order, they are automatically input in the file name input field 1001 and displayed as the initial file name.

At S1209, the display control unit 421 displays the File name setting screen 1000 described previously on the operation unit 220 so that it is possible for a user to perform setting of a file name for a scanned image. Details of this file name setting processing will be described later.

At S1210, the cooperative service request unit 423 determines whether or not the file name automatic input is set and determines the next processing by referring to the response to the request for the processing status at S1206. Specifically, the cooperative service request unit 423 refers to the value of "autoInput" included in the response at the time of completion of the processing shown in FIG. 9C described previously and in a case of "true" meaning that the automatic input is performed, the processing advances to S1211. On the other hand, in a case of "false" meaning that the automatic input is not performed, the processing advances to S1214.

At S1211, the cooperative service request unit 423 determines whether a scanned image similar to the scanned image of this time existed in the past based on the image analysis results acquired at S1208. Specifically, the cooperative service request unit 423 refers to the value of "matched" included in the results of the similar business form determination processing shown in FIG. 16 described previously and in a case of "true" indicating that a similar scanned image exists in the past scanned images, the processing advances to S1212. On the other hand, in a case of "false" indicating that a similar scanned image does not exist, the processing advances to S1214.

At S1212, the cooperative service request unit 423 determines whether a user has changed the initial file name automatically input in the file name input field 1001 in the file name setting processing at S1209. The changing in this case includes, for example, changing the character area used for the file name of this time to one different from the character area used in the initial file name, adding or deleting a separator, and the like. Then, this determination is performed by comparing the value of "value" of "metadataArray" included in the results of the similar business form determination processing in FIG. 16 with the information input in the file name input field 1001 after performing the file name setting for the scanned image of this time. As a result of the comparison, in a case where there is a difference, it is determined that the initial file name has been changed and the processing advances to S1213, and in a case where they match with each other, it is determined that the initial file name has not been changed and the processing advances to S1214. As regards the top character string of the file name that is automatically input by "value" of "formKeys", it may also be possible for the processing to advance to S1214 without regarding that the input information has changed even though the character string has been deleted by a user.

At S1213, the cooperative service request unit 423 transmits the learning request (see FIG. 11 described previously) for the input information at the time of setting, which represents the configuration of the file name set for the scanned image of this time, to the MFP cooperative server 120. As "formId" included in the learning request in this case, the value of "formId" included in the similar business form determination processing results of the image analysis results acquired at S1208 is used. In the example in FIG. 16, "aaaaaaaa-ffff-49ab-acf8-55558888eeee" is input as the value of "formId", and therefore, this is stored in the learning request. Further, in "learningContent", the contents of the input information used at the time of file name setting are stored. First, in "rectInforArray", the coordinate information on the character area to which the character string used for the file name belongs is stored so as to correspond to the number of character areas. Then, in "metadataArray", the information on the character area used for the file name setting and on the separator is stored. To explain the operation performed by a user at this time with reference to Table 1 described previously, first, the user touches "Estimation form" with No. 1 in a preview area 1002 on the File name setting screen 1000. Next, the user touches "Shinagawa Inc." with No. 8 and presses down the Transmit button 1007 lastly. The MFP cooperative server 120 having received the learning request accumulates the input information based on the user operation such as this and uses the accumulated input information in the next and subsequent image analysis processing. In a case of receiving the response to the effect that the learning request has been processed normally from the MFP cooperative server 120 after transmitting the learning request, the processing advances to S1214.

At S1214, the cooperative service request unit 423 associates the processing-target scanned image data and the file name set at S1209 with each other and transmits them to the MFP cooperative server 120. In a case where this transmission is completed, this processing ends. In the present embodiment, the transmission of the scanned image data and the file name thereof is performed last, but it may also be possible to transmit them to the MFP cooperative server 120 in parallel at the point of time of saving of the scanned image data by the scanned image management unit 412 after the scan processing is completed.

The above is the flow of the processing in a case where the storage service focusing attention on the operation in the MFP 110 is used. In the above-described explanation, the scene is supposed in which the file name setting at the time of transforming one scanned image obtained by scanning one estimation form into a file is performed. However, the present embodiment is not limited to this and it is also possible to apply the present embodiment also to the scene in which the file name setting at the time of transforming a plurality of scanned images obtained by scanning a plurality of estimation forms into a file is performed. In this case, it may also be possible to provide a button to turn pages within the File name setting screen 1000 so as to make it possible to set a file name also from the character area in the scanned image on the second page or the third page.

(S)

Following the above, the file name setting processing performed by the display control unit 421 at S1209 described previously is explained in detail along the flowchart shown in FIGS. 18A, 18B, 19A and 19B.

At S1801, the file name (initial file name) is generated, which is displayed in the initial state in the file name input field 1001 on the File name setting screen 1000 described previously. The initial file name is generated by the following procedure. First, the display control unit 421 refers to the response at the time of completion of the processing described previously and sets the value to the top of the file name in a case where some value is input in "value" of "formKeys". For example, in a case where a character string of "scan" is input as "value" of "formKeys", the display control unit 421 sets "scan" to the top of the initial file name. Next, in accordance with the similar business form determination results acquired by accessing "mathingResultUrl", the display control unit 421 sets a predetermined character string. That is, in a case where the value of "matched" is "true" and "matchingScore" is a numerical value larger than or equal to a predetermined value (for example, 0.6 or larger), the display control unit 421 sets a character string in accordance with the file name configuration specified by "value" of "metadataArray". Specifically, the display control unit 421 sets the character string of the character area specified by "rectInfoArray" in accordance with the order specified in "value". In the example of the similar business form determination results, the value "matched" is "true" and "matchingScore" is "0.74 . . . ", and therefore, this is a numerical value larger or equal to the predetermined value. Then, in "value" of "metadataArray", the arrangement is specified in which "fileRegion0" is the first, "separator" is the next, and "fileRegion1" is the last. Consequently, "Estimation form", which is the value of "text" of "fileRegion0", "_(underscore)", which is the value of "separator" included in the processing completion response, and "Shimomaruko Inc.", which is the value of "text" of "fileRegion1", are connected in this order. In this manner, "Estimation form_Shimomaruko Inc." is generated as the initial file name. In a case where some value (for example, "scan_") is input in "value" of "formKeys", "scan_Estimation form Shimomaruko Inc.", which is obtained by adding "scan_" to "Estimation form_Shimomaruko Inc.", is the initial file name. In the similar business form determination results, in a case where the value of "matched" is "false" and "matchedScore" is a numerical value less than the predetermined value, on a condition that a character string is input in "value" of "formKeys", the character string is taken as the initial file name as it is. Further, in a case where no character string is input in "value" of "formKeys", no initial file name is displayed (empty field). In the present embodiment, the two values, that is, the value of "matched" and the value of "matchingScore", that is, information specified in "rectInfoArray" in accordance with the order of "value" of "metaArray" is taken as the condition of the initial file name generation. However, the condition is not limited to this and it may also be possible to take one of the results as the condition. For example, it may also be possible to generate the initial file name by taking only that the value of "matched" is "true" as the condition, or generate the file name by taking only that the value indicating the similarity is larger than or equal to a threshold value as the condition.

At S1802, to which extent the scanned image is reduced (hereinafter, called "initial magnification") and displayed at the time of displaying the scanned image in the initial state in the preview area 1002 on the File name setting screen 1000 is determined. For the determination of the initial magnification, the character recognition results acquired by accessing "ocrResultUrl" are used. First, among all the character areas detected within the scanned image, the leftmost character area and the rightmost character area are found respectively. In this case, the leftmost character area is the character area whose value of the x-coordinate is the minimum value among all the character areas. Further, the rightmost character area is the character area whose total value of the value of the x-coordinate and the value of the width of the character area is the maximum among all the character areas. The magnification that causes the left side of the leftmost character area thus determined to match with the left side of the preview area 1002 and the right side of the character area located at the rightmost position to match with the right side of the preview area 1002 respectively is determined as the initial magnification. In a case where the ends of the determined character areas are caused to match with the ends of the preview area perfectly, there is a possibility that it is not easy for a user to make a selection (perform pressing down) on a condition that the character area is small, and therefore, it may also be possible to determine the initial magnification by giving a predetermined amount of margin. For example, the initial magnification is determined so that a margin corresponding to ten pixels is secured between the left end of the preview area 1002 and the left end of the character area that is displayed at the leftmost position within the preview area 1002, and between the right end of the preview area 1002 and the right end of the character area that is displayed at the rightmost position. Further, in a case where UI components, such as various operation buttons, are displayed in an overlapping on the preview area 1002, it may also be possible to determine the initial magnification so that the character area does not overlap the UI components. Specifically, it may also be possible to determine the initial magnification so that, after subtracting the width of the UI components from the width of the preview area 1002, the leftmost character area and the rightmost character area are included within the width of the remaining area. In the example of the File name setting screen 1000 in FIG. 10 described previously, three operation buttons (enlargement button 1004, reduction button 1005, and restoration button 1006) exist within the preview area 1002, and therefore, the initial magnification is determined so that the character area does not overlap these buttons. Further, there is a case where header information or the like relating to printing processing is printed in the vicinity of the top, bottom, left, and right ends of a scan-target business form and the possibility that the character string of the character area corresponding to the header information or the like such as this is adopted as a part of a file name is faint. Consequently, it may also be possible to exclude the character area existing within a predetermined distance (for example, 50 pixels) from the top, bottom, left, and right ends of a scanned image at the time of finding the above-described leftmost and rightmost character areas.

Figure 21:
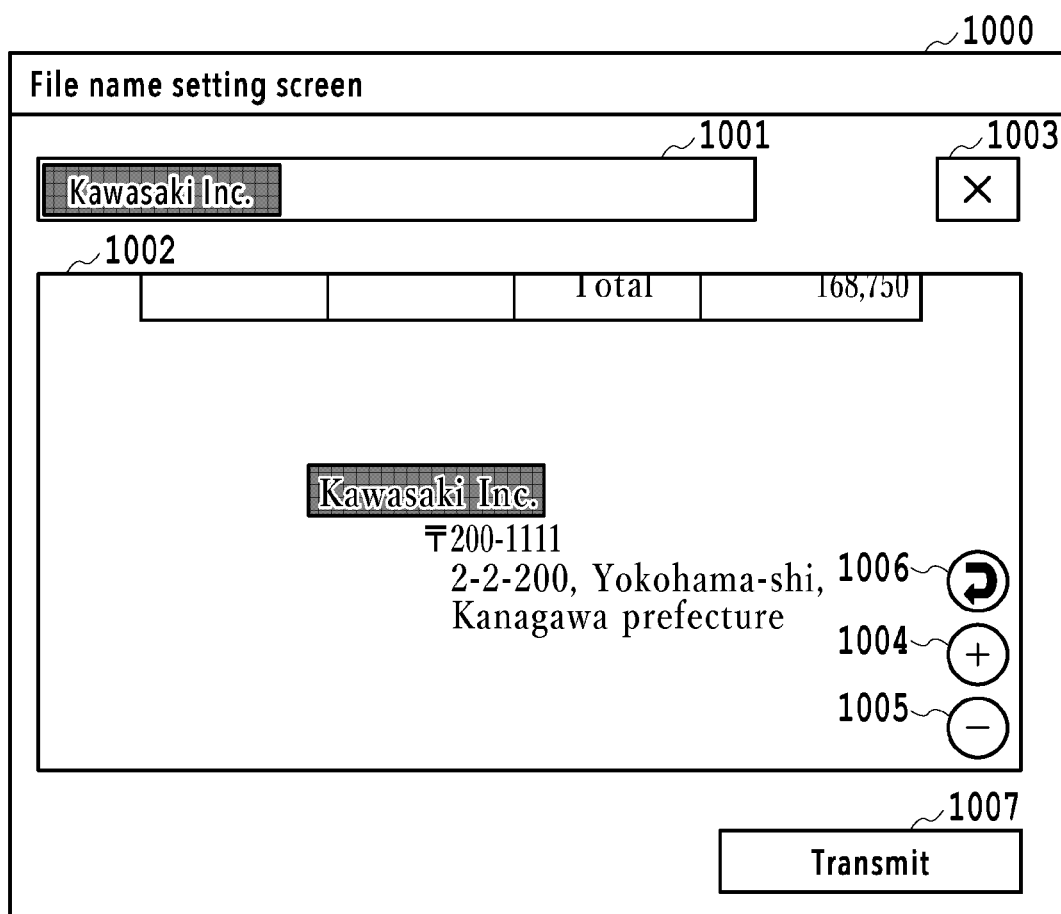
FIG. 21 is a diagram showing an example of the File name setting screen.

At S1803, which portion of the scanned image after enlargement/reduction with the initial magnification determined at S1802 is displayed in the initial state within the preview area 1002 on the File name setting screen 100 is determined. In the scanned image after enlargement/reduction is performed with the magnification determined at S1802 described above, the width within which the leftmost character area and the rightmost character area are included substantially matches with the width of the preview area 1002. Consequently, first, in the horizontal direction, the portion that is displayed in the initial state (hereinafter, called "initial display portion") is determined so that the leftmost and rightmost character areas are just included in the preview area 1002, for example, the left side of the leftmost character area matches with the left side of the preview area 1002. After that, the initial display portion in the vertical direction is determined so that the uppermost character area is located in the vicinity of the top end of the preview area 1002. At this time, in a case where a margin is taken into consideration at the time of determination of the initial magnification, it is sufficient to determine the initial display portion by similarly taking into consideration the margin. For example, it may also be possible to exclude the character area existing within a predetermined distance (for example, 50 pixels) from the top end of the scanned image from the display target and determine the initial display portion so that the character area located at the uppermost position among the character areas other than the character area is displayed at the top end of the preview area 1002. FIG. 20 is a diagram showing the initial display portion determined for the scanned image in FIG. 13. The line frame in FIG. 20 indicates the range of the scanned image displayed in the initial state in the preview area 1002. As a result of determining the initial display portion as described above, there is a case where the character area of the character string is not displayed in the preview area 1002, which is used for the initial file name on a condition that a similar business form exists and the initial file name is automatically input in the file name input field 1001. In this case, it is sufficient to determine the initial display portion so that the character area of the character string used for the initial file name is displayed in the center of the preview area 1002. At this time, it may also be possible to highlight (for example, change the color of) the character string configuring the initial file name automatically input in the file name input field 1001 and the character area of the character string used for the initial file name. FIG. 21 is an example of the File name setting screen 1000 in a case where a character string of "Kawasaki Inc." is automatically input as the initial file name in the scanned image in FIG. 13. Here, the character area and the character string "Kawasaki Inc." that is input in the file name input field 1001 are displayed so that the character area corresponding to the character string "Kawasaki Inc." is located in the center of the preview area 1002 and further, the color thereof is changed. At this time, in a case where the character size in the character area that is highlighted is small, it may also be possible to adjust the initial magnification so as to attain an appropriate character size. It is possible to obtain the initial magnification after the adjustment based on, for example, the size of the touch panel of the operation unit 220 and the range that is displayed in the initial state in the preview area 1002. Specifically, it is sufficient to find the point of the character size based on the height of the character area of the character string used for the initial file name and adjust the initial magnification of the preview so that the found point becomes larger than or equal to a threshold value (larger than or equal to a predetermined size).

At S1804, by using the processing results at S1801 to S1803, the File name setting screen 1000 described previously is displayed on the operation unit 220. A user sets a file name of the scanned image that is saved in the storage server 130 by using the File name setting screen 1000 illustrated in FIG. 10. In the following, this is explained in detail.

1) File Name Input Field

Figure 22:
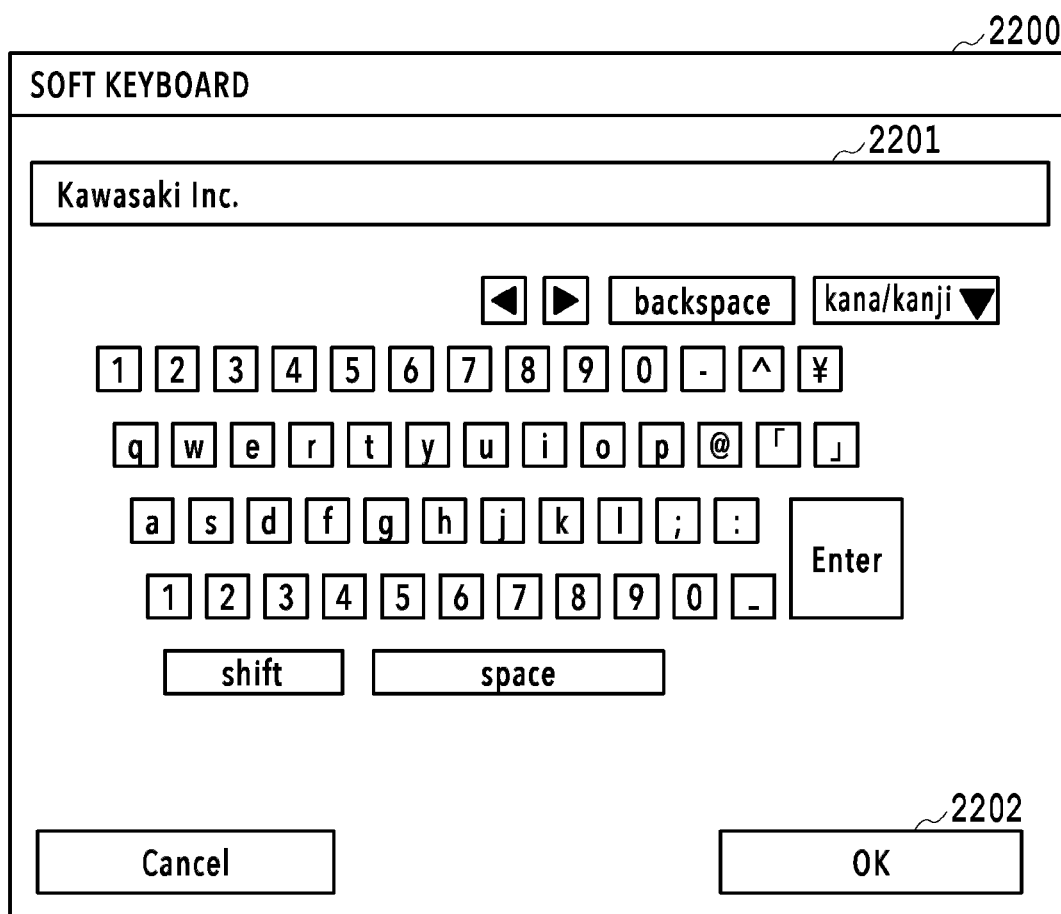
FIG. 22 is a diagram showing an example of a soft keyboard.

In a case where a user touches the file name input field 1001, the display of the touch panel of the operation unit 220 switches to a soft keyboard and it is possible to input an arbitrary character, edit an automatically input character string, and so on. For example, in a case where a user touches the character string portion in the file name input field 1001 in which "Kawasaki Inc." is input automatically as in the example in FIG. 21 described previously, a soft keyboard 2200 shown in FIG. 22 is displayed. At this time, as shown in FIG. 22, the soft keyboard 2200 is displayed in the state where the touched character string is input in an input area 2201. Due to this, it is possible for a user to modify the touched character string "Kawasaki Inc." by operating the soft keyboard 2200. Further, in a case where the file name input field 1001 in the state where no character string is input as shown in FIG. 10 is touched, the soft keyboard 2200 in the state where nothing is input in the input area 2201 is displayed and it is possible for a user to input an arbitrary character string in the file name input field 1001 by operating the soft keyboard 2200.

2) Preview Area

In the preview area 1002, as described previously, the specific portion of the scanned image for which magnification processing has been performed is displayed. Then, in a case where a user touches and selects an arbitrary character area within the preview area 1002, the character string of the selected character area is added to the file name input field 1001. At this time, it may also be possible to highlight the selected character area by underlining the character area corresponding to the selection, enclosing the character area by a frame, coloring the character area, and so on, so that it is known that the character area is selected. Further, it may also be possible to change the display portion, change the display magnification, and so on, so that the selected character area is located in the center. Furthermore, in a case where a plurality of character areas is selected, it may also be possible to make the display aspect of the character area differ from one another by coloring the respective character areas in different colors. Then, in a case where a user touches the character area once selected again, the selected state is cancelled (that is, the line or color attached to the character area is deleted and the original state returns) and the character string corresponding to the character area within the file name input field 1001 is also deleted. In the present embodiment, in the state where no character area is selected, the frame or the like indicating each character area is not displayed in the preview area 1002. However, it may also be possible to display in advance a frame or the like indicating each character area so that a user can recognize the portion the user can touch and change the color of the portion in a case where the portion is selected, and so on. Further, it may also be possible to enable a user to switch whether to display a frame or the like so that each character area is recognized by a button or the like. Then, it is possible for a user to move the image portion that is displayed by performing the swipe operation in the preview area 1002.

3) Various Operation Buttons

A "x" mark button 1003 is a deletion button for deleting the last character string of the character string that is input in the file name input field 1001. The "+" mark button 1004 is an enlargement button for displaying the image being displayed in the preview area 1002 in the enlarged state and is used in a case where it is desired to display each character area in the enlarged state. The "−" mark button 1005 is a reduction button for displaying the image being displayed in the preview area 1002 in the reduced state and is used in a case where it is desired to display a wider range. In a case where enlargement or reduction is performed, the display position is adjusted so that the coordinates of the center in the preview area 1002 are the same before and after enlargement or reduction is performed. The "U-turn arrow" mark button 1006 is a restoration button for returning the preview area 1002 to the initial display state in a case where the display position has been moved by the swipe operation or the display magnification has been changed by pressing down the enlargement button 1004 or the reduction button 1005. The "Transmit" button 1007 is a button for transforming a scanned image into a file with the file name set on the File name setting screen 1000 and saving the file in the storage server 130. In response to the pressing down of the "Transmit" button 1007, the scanned image data is transmitted to the MFP cooperative server 120 along with the information on the set file name.

Figure 23:
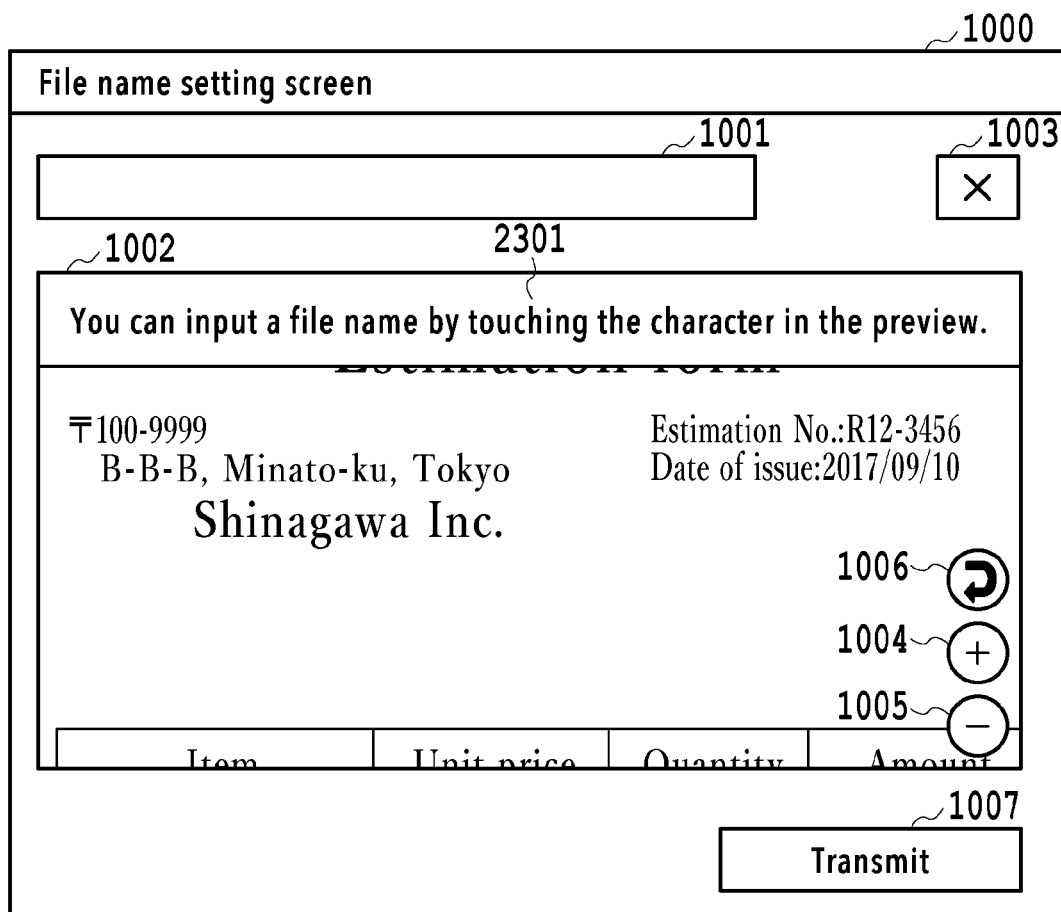
FIG. 23 is a diagram showing an example of the File name setting screen on which an operation guidance is displayed.

At S1805, an operation guidance is displayed within the File name setting screen 1000 in the initial display state. By this operation guidance, it is also possible for a user who performs the operation for the first time to easily understand that a file name can be set by touching and selecting the character area within the preview area 1002. FIG. 23 shows the state where a message 2301 as the operation guidance is displayed in an overlapping manner at the upper portion of the preview area 1002 in the File name setting screen 1000 shown in FIG. 10. The operation guidance such as this is not necessary for a user who already knows the operation method, and therefore, the operation guidance is set to nondisplay at the point in time of detection of some user operation, such as the touch operation and the swipe operation. Further, at the upper portion of a general document, in many cases, characters or figures having an important meaning for the document exist, for example, such as the document title, the company name, the business form No., and the date. Consequently, it may also be possible to shift the image portion downward and so on, which is displayed in the preview area 1002, in accordance with the attribute of the character string so that the character areas of these character strings having an important meaning and the operation guidance do not overlap. Further, in a case where the operation guide overlap one of the character areas or in a case where the operation guide is included within a predetermined distance from the character area, it is sufficient to determine the display position of the operation guidance so that the operation guide does not overlap or does not become too close to the character area. As described above, by determining the display position of the operation guide flexibly instead of fixing the display position, it is made easier for a user to select a character area.

S1806 is processing to monitor the presence/absence of a user operation. The presence/absence of a user operation is checked at predetermined intervals and in a case where some user operation is detected, the processing advances to S1807. Then, at S1807, as described previously, the operation guidance is set to nondisplay.

S1808 to S18015 are determination processing to determine the next processing in accordance with the contents of the detected user operation. In a case where the processing corresponding to the detected user operation is completed, the processing returns to S1806 and the detection of the next user operation is awaited.

At S1808, whether the detected user operation is the touch operation to one of the character areas within the preview area 1002 is determined. Specifically, first, the coordinates of the touched position are transformed in association with the coordinates of the scanned image. Then, in a case where the coordinates after the transformation are included in one of the character areas specified in "regions" of the character recognition results (see FIG. 15) described previously, it is determined that the user operation is the touch to the character area. In a case where the determination results indicate the touch to the character area, the processing advances to S1816 and in a case where the user operation is not the touch to the character area, the processing advances to S1809. At S1816 in a case where the user operation is the touch to the character area, whether the touched character area is already selected is determined. In a case where the touched character area is a character area that is not selected yet, the processing advances to S1817 and in a case where the touched character area is a character area that is already selected, the processing advances to S1818.

At S1817, the character string of the touched character area is added to the file name input field 1001 and highlight processing to indicate that the character area is selected is performed for the character area. At this time, in a case where another character string is not input in the file name input field 1001, the character string is added as it is. Then, that the character area is used for the file name setting is stored as input information at the time of the file name setting. On the other hand, in a case where a character string of another character area is already input in the file name input field 1001, after a separator is added, the character string of the touched character area is added. In this case, in addition to the fact that the character area is used for the file name setting, that the separator is inserted between the character strings, such as that "first character area", "separator", and "second character area", is also stored. FIG. 24 is a diagram showing the File name setting screen 1000 in a case where the character area whose characters are recognized as "Estimation form" is selected first, and following this, the character area whose characters are recognized as "Shimomaruko Inc." is selected. In the file name input field 1001, the two character strings corresponding to the order of the touched character areas are input and between the two character strings, an underscore as the separator is input.

At S1818, the character string of the touched character area is deleted from the file name input field 1001 and the highlight indicating that the character area is selected is cancelled and the state returns to the normal display state indicating that no character area is selected. Further, in a case where a separator is attached to the character string, the separator is also deleted together. For example, it is assumed that the fine name configuration used for the generation of the initial file name is ["first character area", "separator", "second character area"]. In this case, on a condition that a user touches the character area of "first character area", the separator is also deleted together with the character string of the first character area and only the character string of "second character area" remains in the file name input field 1001.

At S1809 in a case where the detected user operation is not the touch to the character area, whether the detected user operation is the swipe operation within the preview area 1002 is determined. In a case where the swipe operation is detected, the processing advances to S1819 and in the other cases, the processing advances to S1810.

At S1819, processing to move the image portion that is displayed in the preview area 1002 in the direction of the swipe operation is performed. Specifically, in accordance with the amount of movement by which a user moves his/her finger on the touch panel, the image portion that is displayed in the preview area 1002 is updated. It may also be possible to limit the processing to a case where the touch operation in an area other than the character area within the preview area 1002 is detected. Further, even though the user operation is the touch operation to the character area, it may also be possible to handle the user operation as the swipe operation without handling the user operation as the touch to the character area in accordance to the amount by which a user moves his/her finger after that.

At S1810, whether the detected user operation is the pressing down of the enlargement button 1004 or the reduction button 1005 is determined. In a case of the pressing down of the enlargement button 1004 or the reduction button 1005, the processing advances to S1820 and in the other cases, the processing advances to S1811.

At S1820, processing to enlarge or reduce the image portion being displayed in the preview area 1002 is performed. Specifically, in a case where the enlargement button 1004 is pressed down, processing to increase the magnification of the scanned image by a predetermined amount is performed, and in a case where the reduction button 1005 is pressed down, processing to decrease the magnification of the scanned image by a predetermined amount is performed. Here, the predetermined amount is arbitrary, and for example, about 10% on the basis of the current magnification. At this time, in a case where the initial magnification exists or a magnification with which the width/height of the scanned image and the width/height of the preview area 1002 match with each other exists during the enlargement or the reduction by the predetermined amount, the enlargement or the reduction may be stopped at the magnification. The control is performed so that the image portion is not reduced with a magnification or less with which the entire scanned image is included within the preview area 1002 (minimum magnification) and the image portion is not enlarged with a magnification or more with which the minimum character area becomes a predetermined size (maximum magnification).

At S1811, whether the detected user operation is the pressing down of the restoration button 1006 is determined. In a case of the pressing down of the restoration button 1006, the processing advances to S1821 and in the other cases, the processing advances to S1812.

At S1821, processing to return the preview area 1002 to the initial display state is performed. Specifically, processing to return the magnification of the scanned image that is displayed in the preview area 1002 to the initial magnification determined at S1802 and further, to return the display portion in the preview area 1002 to the initial display portion determined at S1803 is performed. At this time, in a case where the adjustment of the initial magnification and the initial display portion has been performed, it is desirable to return the magnification and the display portion to the initial magnification and the initial display portion after the adjustment.

At S1812, whether the detected user operation is the touch operation to the character string input in the file name input field 1001 is determined. At this time, in a case where the touch operation to the blank area behind the character string input in the file name input field 1001 is detected, it is sufficient to handle the touch operation as the touch operation to the last character string. In a case of the touch operation to the character string input in the file name input field 1001, the processing advances to S1822 and in the other cases, the processing advances to S1813.

At S1822, an editing soft keyboard in the state where the character string for which the touch operation has been performed is input in the input area 2201 is displayed on the operation unit 220. Here, it is assumed that the File name setting screen 1000 is in the state shown in FIG. 24. In this state, in a case where the touch operation to the character string "Estimation form" in the file name input field 1001 is detected, the soft keyboard 2200 in the state where the character string "Estimation form" is input in the input area 2201 of the soft keyboard is displayed. Further, in a case where the touch operation to the character string "Shimomaruko Inc." or the touch operation to the blank area behind the character string is detected, the soft keyboard 2200 in the state where the characters "_Shimomaruko Inc.", which is the last character string, are input in the input area 2201 is displayed. The operation of the soft keyboard 2200 is the same as that of a general keyboard, and therefore, explanation thereof is omitted. S1823 that follows is processing to monitor the presence/absence of a user operation. The presence/absence of pressing down of an OK button 2202 in the soft keyboard 2200 is checked at predetermined intervals and in a case where the pressing down of the OK button 2202 is detected, the processing advances to S1824. In a case where a key other than the OK button is pressed down, in accordance with the key that is pressed down, editing of the character string displayed in the input area 2201 is performed. For example, it is possible for a user to modify a character string erroneously recognized in the character recognition processing by using the soft keyboard 2200.

At S1824, whether the change to delete the separator has been performed is determined. In the present embodiment, this determination is performed only in a case where the character string touched at S1812 is displayed along with the separator at S1822, and the character string that is displayed without the separator is handled as the character string for which deletion of the separator has not been performed. That is, in a case where the character string is displayed in the state where the separator is attached to the top of the character string, based on whether the separator exists at the top of the character string at the point in time the OK button 2202 is pressed down, whether the editing of the character string to delete the separator has been performed is determined. For example, in a case where the touch operation to the character string "Shimomaruko Inc." is performed at S1812, as described above, the character string is displayed in the input area 2201 of the soft keyboard 2200 in the state of "_Shimomaruko Inc." in which the separator is attached to the top. Then, by checking whether the separator remains at the top, whether the deletion of the separator has been performed is determined. Further, in a case where the touch operation to the character string "Estimation form" is performed at S1812, as described above, in the input area 2201, "Estimation form" is displayed, and therefore, in this case, the character string is handled as that for which the change to delete the separator has not been performed.

In the example described above, explanation is given on the assumption that the character string to the top of which the separator is attached is displayed in the input area 2201 in a case where the separator exists before the character string touched at S1812, but this is not limited. For example, in a case where the separator exists behind the character string touched at S1812, on a condition that the configuration is made so that the touched character string is displayed in the input area 2201 in the state where the separator is attached to the end of the character string, it is also possible to perform the same determination. That is, a case is explained where the configuration is made so that the character string is displayed in the input area 2201 of the soft keyboard 2200 in the state where the separator is attached to the end of the character string, such as "Estimation form_", in accordance with the touch operation to the character string "Estimation form" in the example in FIG. 24. In this case, it is sufficient to determine whether the deletion of the separator has been performed by checking whether the separator remains at the end at this step S1824.

In a case where it is determined that the deletion of the separator has been performed at S1824, the processing advances to S1825. Then, at S1825, that the separator has been deleted from the file name is stored. For example, it is assumed that the file name configuration used for the generation of the initial file name is ["first character area", "separator", "second character area"]. At this time, in a case where a user touches the character string corresponding to the "second character area" in the file name input field 1001 and deletes the separator by using the soft keyboard 2200, the file name configuration after the change will be ["first character area", "second character area"]. Then, the information on the file name configuration after this change is stored.

At S1826 that follows, whether the change to add a separator to the file name has been performed is determined. In a case where it is determined that a separator has been added, the processing advances to S1827. Then, at S1827, that a separator has been added to the file name is stored. For example, it is assumed that the file name configuration used for the generation of the initial file name is ["first character area", "second character area"]. At this time, in a case where a user touches the character string corresponding to the "second character area" in the file name input field 1001 and adds a separator to the top thereof by using the soft keyboard 2200, the file name configuration after the change will be ["first character area", "separator", "second character area"]. Then, the information on the file name configuration after this change is stored.

Then, at S1828, after the display screen of the operation unit 220 is returned from the soft keyboard 2200 to the File name setting screen 1000, the file names is modified to the contents after the change. At this time, it may also be possible to change the display portion of the scanned image so that the character area corresponding to the modified character string is located in the center of the preview area 1002. Even though a part of the character string used for the file name is modified, in a case where the fine name configuration is not changed, the information on the file name configuration is not stored newly. However, in a case where the modification to delete all the characters included in a certain character string is performed, the file name configuration is also changed. Consequently, in this case also (although this is omitted in the flowchart), the configuration information on the file name after the change is stored. For example, it is assumed that the file name configuration used for the generation of the initial file name is ["first character area", "separator", "second character area"]. At this time, it is assumed that a user touches the character string corresponding to the "second character area" in the file name input field 1001 and deletes all the characters by using the soft keyboard 2200. In this case, the separator that is no longer necessary is also deleted and the file name configuration after the change changes to ["first character area"], and therefore, the information on the file name configuration after the change is stored.

At S1813, whether the detected user operation is the touch operation to the empty file name input field 1001 in the state where no character string is input is determined. In a case of the touch operation to the empty file name input field 1001, the processing advances to S1829 and in the other cases, the processing advances to S1814.

At S1829, a character string addition soft keyboard in the state where nothing is input in the input area 2201 is displayed on the operation unit 220. S1830 that follows is processing to monitor the presence/absence of a user operation. The presence/absence of pressing down of the OK button 2202 on the soft keyboard 2200 is checked at predetermined intervals and in a case where the pressing down of the OK button 2202 is detected, the processing advances to S1831. Then, at S1831, after the display screen of the operation unit 220 is returned from the soft keyboard 2200 to the File name setting screen 1000, the input character string is added to the file name.

At S1814, whether the detected user operation is the pressing down of the deletion button 1003 is determined. In a case of the pressing down of the deletion button 1003, the processing advances to S1832 and in the other cases, the processing advances to S1815. At S1832, the last character string of the character string input in the file name input field 1001 is deleted. For example, in a case where the file name configuration used for the generation of the initial file name is ["first character area", "separator", "second character area"], the character string corresponding to the "second character area" is deleted by the pressing down of the deletion button 1003. As a result of this, the file name configuration after the deletion is ["first character area"] and the file name is only the character string corresponding to the "first character area". At this time, the character area corresponding to the deleted character string is returned to the state indicating that the character area is not selected in the preview area 1002. Then, the information on the file name configuration after the change is stored.

At S1815, whether the detected user operation is the pressing down of the Transmit button 1007 is determined. In a case of the pressing down of the Transmit button 1007, this processing is terminated and the processing advances to S1210 in the flowchart in FIG. 12.

The above is the contents of the file name setting processing performed at S1209.

Modification Example_1

In a case where the initial magnification determined at S1802 (determination of initial magnification) described above based on the leftmost character area and the rightmost character area is followed, the average height of each character area displayed in a preview is less than a predetermined threshold value, it may also be possible to change the initial magnification so that the average height becomes larger than or equal to the predetermined threshold value. In this case, the "average height" may be the average for all the character areas or may be the average for part of the character areas. As the example of the average for part of the character areas, mention is made of the average of the heights of the character areas to be displayed in the preview area 1002 with the determined initial magnification, the average of the heights of the character areas in a specific portion (for example, upper half portion) of a scanned image, and the like. A specific example is explained. Here, it is assumed that the interval (width) between the left end of the leftmost character area and the right end of the rightmost character area is 2,000 px, the width of the preview area 1002 is 800 px, and the predetermined threshold value is 15 px. Here, the initial magnification that is calculated is 0.4 (=800÷2,000) and in a case where the average of the heights of all the character areas is 60 px, the average of the heights of all the character areas is 24 px (=60×0.4) and this is not less than the predetermined threshold value, and therefore, 0.4 is taken as the initial magnification as it is. On the other hand, in a case where the average of the heights of all the character areas is 30 px, the average of the heights of all the character areas is 12 pix (=30×0.4). In this case, the average of the heights of all the character areas is less than the predetermined threshold value, and therefore, the initial magnification is changed to 0.5 (=0.4× 15÷12) so that the average becomes larger than or equal to the predetermined threshold value (here, the average is the same value as the threshold value). FIG. 25 shows an example of the initial display of the File name setting screen 1000 in a case where the average of the heights of the character areas does not satisfy the threshold value and the initial magnification is adjusted. In this example, after the adjustment to increase the value of the initial magnification is performed, the display portion is determined in accordance with the left end of the leftmost character area and the top end of the uppermost character area at S1803. As a result of that, the area corresponding to the right side of the business form is no longer included in the display portion, but the visibility of each character area existing within the preview area 1002 is secured.

Modification Example_2

In a case where there is a plurality of character areas used for the initial file name at S1803 (determination of initial display portion) described above, it may also be possible to determine the display portion so that the uppermost character area of the used character areas is displayed in the preview area 1002. Further, it may also be possible to determine the meaning and the type of the character string in each character area and adjust the display portion so that the character area having a strong possibility of being used for the file name is displayed within the preview area 1002. Furthermore, it may also be possible to determine the display portion so that the character areas corresponding to the number of character areas specified in advance are displayed in the preview area 1002. Still furthermore, it may also be possible to determine the display portion so that the middle point between the uppermost character area and the lowermost character area of the character areas of the character strings used for the initial file name is located in the center of the preview area 1002.

Modification Example_3

In a case where the initial file name in accordance with the file name configuration of the similar business form is automatically input in the file name input field 1001 at S1805 (display of operation guidance) described above, it may also be possible to display the operation guidance so as not to overlap the character area of the character string used for the initial file name. At this time, a case is considered where a plurality of character strings used for the initial file name exists and it is difficult to display the operation guidance so as not to overlap those character areas. In the case such as this, it may also be possible to give priority to the character area of the character string located at the top of the initial file name and display the operation guidance so as to overlap part or the whole of the character area of the character string located at the end. Further, in a case where a document property other than the initial file name, for example, metadata is set, it may also be possible to determine the character area that should be avoided from being overlapped by the operation guidance in accordance with the type of the document property and determine the display position of the operation guidance. For example, in a case where a value is set to the document property whose type is date, the operation guidance is displayed so as not to overlap the character area of the date in the target document. At this time, whether the character string corresponding to each character area is a date is determined by determining whether the character string extracted from the scanned image corresponds to a specific character array. For example, in a case where figures are input to "yy", "mm", and "dd" respectively in the format of yy/mm/dd, it is possible to determine that the character string is a date.

Modification Example_4

At above-described S1822 (display of editing soft keyboard), it may also be possible to display the editing soft keyboard in the state where the entire file name is input within the input area 2201 in place of displaying the editing soft keyboard in the state where the touched character string is input. In this case, in order to prevent a user from erroneously recognizing the editing target, the character string is displayed so that the range of the editing target is known by highlighting (changing the color of, attaching a frame to, and so on) the character string to distinguish it from another character string, displaying the cursor at the end of the character string, and so on. Further, in place of displaying the editing soft keyboard in response to the touch operation to the character string input in the file name input field 1001, it may also be possible to display the editing soft keyboard by waiting for a further additional user operation (for example, pressing down of a dedicated button, not shown schematically).

Modification Example_5

Further, in the explanation of the present embodiment, in a case where the touch operation to the character area by a user is detected, the processing (S1817, S1818) to add or delete the character string of the touched character area to or from the file name is performed. However, there is a case where the response of the system is slow, and therefore, it takes time until the addition or deletion of the target character string is reflected in the file name after the touch operation is detected. In this case, it is considered that a user erroneously determines that the system does not respond to the touch operation of the user him/herself and repeats the touch operation several times for the same character area. In the situation, there may be a case where the addition and deletion of the character string of the same character area are performed repeatedly and it is not possible to stop in the state desired by the user. For example, in a case where a user touches a deletion-target character string a plurality of times, such a thing that the deletion-target character string is input again may occur. Consequently, in order to prevent the touch operation for the same character area from being performed repeatedly during the addition/deletion processing, it may also be possible to design the system so that the touch operation for new addition or deletion for the same character area is not received until the addition/deletion processing is completed. At this time, it may also be possible to display a message indicating that the processing is in progress together. Due to this, in the input operation at the time of the file name setting, it is possible to prevent addition or deletion of a character string not intended by a user from being performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present invention, it is possible to implement deletion of an already-input character string with a simpler operation without using a dedicated deletion button. Due to this, it is made possible to delete a character string with less time and effort, and therefore, the operation efficiency of a user is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-080362, filed Apr. 19, 2019 which is hereby incorporated by reference wherein in its entirety.

What is claimed is:

1. An image processing apparatus for setting a property to a scanned image obtained by scanning a document, the image processing apparatus comprising:
   at least one memory that stores a program; and
   at least one processor that executes the program to perform:
   detecting character areas from the scanned image;
   controlling to display the scanned image and an input field for inputting a property to be set to the scanned image;
   controlling to input, in a case where a user selects one character area from among the detected character areas in the displayed scanned image and where no character string is input in the input field, a first character string corresponding to the selected one character area into the input field;
   controlling to add, in a case where the user selects one character area from among the detected character areas in the displayed scanned image and where one or more second character strings other than the first character string corresponding to the selected one character area are already input in the input field, both of a separator and the first character string corresponding to the selected one character area to the one or more second character strings inputted in the input field; and
   controlling to delete, in a case where the user selects one character area from among the detected character areas in the displayed scanned image and where one or more character strings including the first character string corresponding to the selected one character area are already input in the input field, the first character string corresponding to the selected one character area from the one or more character strings being inputted in the input field.

2. The image processing apparatus according to claim 1, wherein
   the user selects the one character area by a touch operation for the scanned image displayed on a touch panel display.

3. The image processing apparatus according to claim 1, wherein
   the property is a file name of the scanned image.

4. The image processing apparatus according to claim 1, wherein the separator is an underscore or a hyphen.

5. A control method of an image processing apparatus for setting a property to a scanned image obtained by scanning a document, the image processing apparatus comprising a user interface having a touch panel, the control method comprising:
   detecting character areas from the scanned image;
   controlling to display the scanned image and an input field for inputting a property to be set to the scanned image;
   controlling to input, in a case where a user selects one character area from among the detected character areas in the displayed scanned image and where no character string is input in the input field, a first character string corresponding to the selected one character area into the input field;
   controlling to add, in a case where the user selects one character area from among the detected character areas in the displayed scanned image and where one or more second character strings other than the first character string corresponding to the selected one character area are already input in the input field, both of a separator and the first character string corresponding to the selected one character area to the one or more second character strings inputted in the input field; and
   controlling to delete, in a case where the user selects one character area from among the detected character areas in the displayed scanned image and where one or more character strings including the first character string corresponding to the selected one character area are already input in the input field, the first character string corresponding to the selected one character area from the one or more character strings being inputted in the input field.

6. A non-transitory computer readable storage medium storing a program for causing a computer to perform a control method of an image processing apparatus for setting a property to a scanned image obtained by scanning a document, the image processing apparatus comprising a user interface having a touch panel, the control method comprising:
   detecting character areas from the scanned image;
   controlling to display the scanned image and an input field for inputting a property to be set to the scanned image;
   controlling to input, in a case where a user selects one character area from among the detected character areas in the displayed scanned image and where no character string is input in the input field, a first character string corresponding to the selected one character area into the input field;
   controlling to add, in a case where the user selects one character area from among the detected character areas in the displayed scanned image and where one or more second character strings other than the first character string corresponding to the selected one character area are already input in the input field, both of a separator and the first character string corresponding to the selected one character area to the one or more second character strings inputted in the input field; and
   controlling to delete, in a case where the user selects one character area from among the detected character areas in the displayed scanned image and where one or more character strings including the first character string corresponding to the selected one character area are already input in the input field, the first character string corresponding to the selected one character area from the one or more character strings being inputted in the input field.

7. An apparatus for setting a property to a scanned image obtained by scanning a document, the apparatus comprising:
   at least one memory that stores a program; and
   at least one processor that executes the program to perform:
   controlling to display the scanned image and an input field for inputting a property to be set to the scanned image;
   controlling to input, in a case where a user selects one character area in the displayed scanned image and where no character string is input in the input field, a first character string corresponding to the selected one character area into the input field;
   controlling to add, in a case where the user selects one character area in the displayed scanned image and where one or more second character strings other than the first character string corresponding to the selected one character area are already input in the input field, both of a separator and a first character string corresponding to the selected one character area to the one or more second character strings inputted in the input field; and controlling to delete, in a case where the user deselects one character area in the displayed scanned image and where one or more character strings including the first character string corresponding to the deselected one character area are already input in the input field, the first character string corresponding to the deselected one character area from the one or more character strings being inputted in the input field.

8. The apparatus according to claim 7, wherein, in the case where the user selects one character area in the displayed scanned image and where no character string is input in the input field, the first character string corresponding to the selected one character area is inputted into the input field, and the selected one character area is highlighted in the displayed scanned image.

9. The apparatus according to claim 7, wherein, in the case where the user selects the one character area in the displayed scanned image and where one or more second character strings other than the first character string corresponding to the selected one character area are already input in the input field, both of a separator and a first character string corresponding to the selected one character area are added to the one or more second character strings inputted in the input field, and both of the selected one character area and one or more character areas corresponding to the one or more second character strings are highlighted in the displayed scanned image.

10. The apparatus according to claim 7, wherein, the user deselects one character area in the displayed scanned image and where one or more character strings including the first character string corresponding to the deselected one character area are already input in the input field, the first character string corresponding to the deselected one character area is deleted from the one or more character strings being inputted in the input field, and the deselected one character area is not highlighted.

11. The apparatus according to claim 7, wherein the property is a file name of the scanned image.

12. The apparatus according to claim 7, wherein the separator is an underscore or a hyphen.

13. The apparatus according to claim 7, wherein the first character string corresponding to the selected one character area is a character string that is obtained by performing an optical character recognition processing to the selected one character area.

14. The apparatus according to claim 7, wherein one or more character strings which have been input in the input field is able to be edited by a user using a keyboard.

15. A method for setting a property to a scanned image obtained by scanning a document, the method comprising:
controlling to display the scanned image and an input field for inputting a property to be set to the scanned image;
controlling to input, in a case where a user selects one character area in the displayed scanned image and where no character string is input in the input field, a first character string corresponding to the selected one character area into the input field;
controlling to add, in a case where the user selects one character area in the displayed scanned image and where one or more second character strings other than the first character string corresponding to the selected one character area are already input in the input field, both of a separator and a first character string corresponding to the selected one character area to the one or more second character strings inputted in the input field; and
controlling to delete, in a case where the user deselects one character area in the displayed scanned image and where one or more character strings including the first character string corresponding to the deselected one character area are already input in the input field, the first character string corresponding to the deselected one character area from the one or more character strings being inputted in the input field.

16. A non-transitory computer readable storage medium storing a program for causing a computer to perform a method for setting a property to a scanned image obtained by scanning a document, the method comprising:
controlling to display the scanned image and an input field for inputting a property to be set to the scanned image;
controlling to input, in a case where a user selects one character area in the displayed scanned image and where no character string is input in the input field, a first character string corresponding to the selected one character area into the input field;
controlling to add, in a case where the user selects one character area in the displayed scanned image and where one or more second character strings other than the first character string corresponding to the selected one character area are already input in the input field, both of a separator and a first character string corresponding to the selected one character area to the one or more second character strings inputted in the input field; and
controlling to delete, in a case where the user deselects one character area in the displayed scanned image and where one or more character strings including the first character string corresponding to the deselected one character area are already input in the input field, the first character string corresponding to the deselected one character area from the one or more character strings being inputted in the input field.

* * * * *